United States Patent
Wakahara

[19]

[11] Patent Number: 5,966,151
[45] Date of Patent: Oct. 12, 1999

[54] IMAGE FORMING APPARATUS

[75] Inventor: Shirou Wakahara, Osaka, Japan

[73] Assignee: Sharp Kabushiki Kaisha, Osaka, Japan

[21] Appl. No.: 08/572,644

[22] Filed: Dec. 14, 1995

[30] Foreign Application Priority Data

Dec. 27, 1994 [JP] Japan .................................. 6-326391
Nov. 9, 1995 [JP] Japan .................................. 7-291481

[51] Int. Cl.$^6$ .................................................. G03G 13/06
[52] U.S. Cl. ............................................ 347/55; 347/140
[58] Field of Search .............................. 347/55, 103, 140

[56] References Cited

U.S. PATENT DOCUMENTS

| | | | |
|---|---|---|---|
| 4,491,855 | 1/1985 | Fujii et al. | 347/55 |
| 5,121,114 | 6/1992 | Larson et al. | 347/55 |
| 5,170,185 | 12/1992 | Takamura et al. | 347/55 |
| 5,179,397 | 1/1993 | Ohzeki et al. | 347/140 |
| 5,235,354 | 8/1993 | Larson | 347/55 X |
| 5,305,026 | 4/1994 | Kazuo et al. | 347/55 |
| 5,504,509 | 4/1996 | Kagayama | 347/55 |
| 5,559,586 | 9/1996 | Wada | 347/55 X |
| 5,606,402 | 2/1997 | Fujita et al. . | |
| 5,629,726 | 5/1997 | Yamasa . | |

FOREIGN PATENT DOCUMENTS 6-155 798   6/1994   Japan .

OTHER PUBLICATIONS

U.S. application Ser. No. 08/534,280, Ueda, filed Sep. 27, 1995, Sharp K.K.

*Primary Examiner*—N. Le
*Assistant Examiner*—Hai C. Pham
*Attorney, Agent, or Firm*—Dike, Bronstein, Roberts & Cushman, LLP; David G. Conlin; George W. Neuner

[57] ABSTRACT

An image forming apparatus includes control power source section for controlling a potential to be supplied to a control electrode so that the potential becomes closer to a potential of the holder than a potential on center portions of gates caused by a potential difference across the holder and a counter electrode formed by a high voltage power source section when the charged toner is allowed to pass the gates. In accordance with the above arrangement, the toner receives electric force directing towards the center portions of the gates, and thus a prescribed-shaped dot having a smaller diameter than of the gates is formed on a recording medium. Moreover, since toner does not scatter, a dot to be formed on a recording medium has a clear outline and obtains sufficient density. Therefore, a clear image with high contrast can be obtained. Quality of an image formed on a recording medium can be improved only by controlling the potential to be supplied to the control electrode. Consequently, an image with good quality can be formed on a recording medium by satisfactorily controlling flying of the toner, thereby improving resolution of the image.

34 Claims, 14 Drawing Sheets

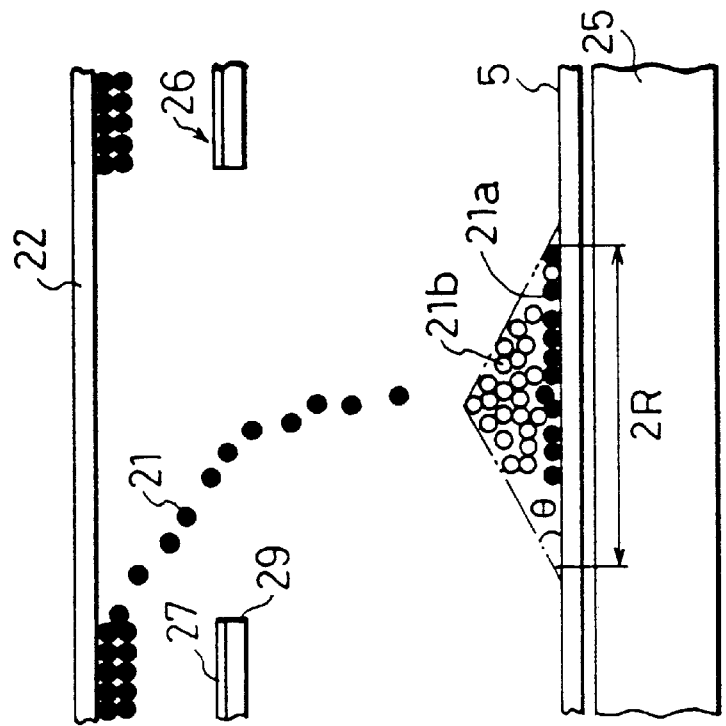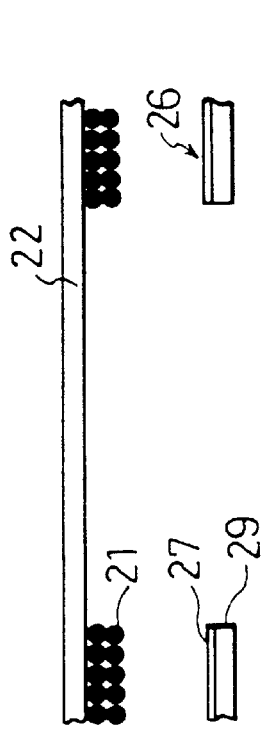

FIG.16
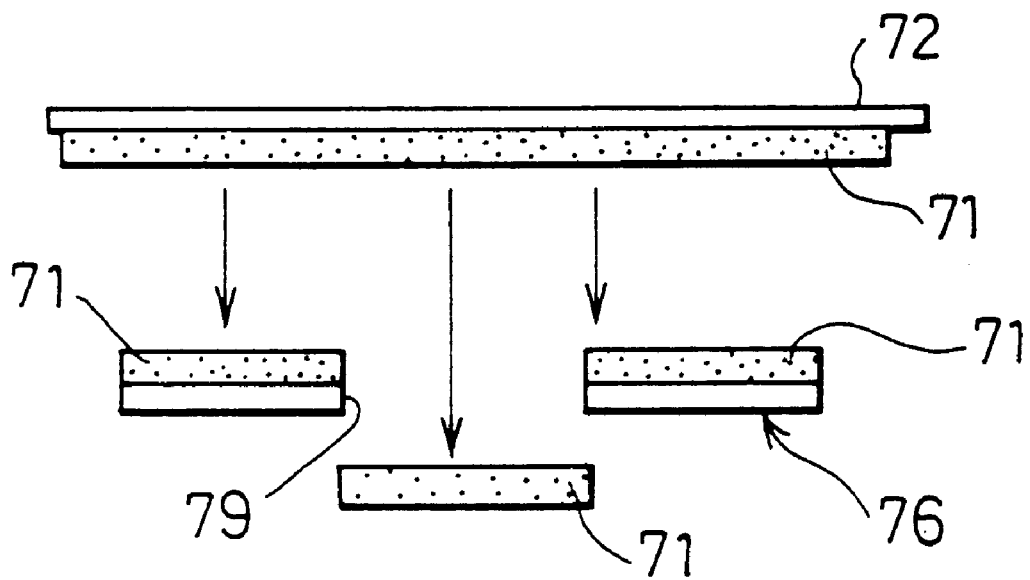
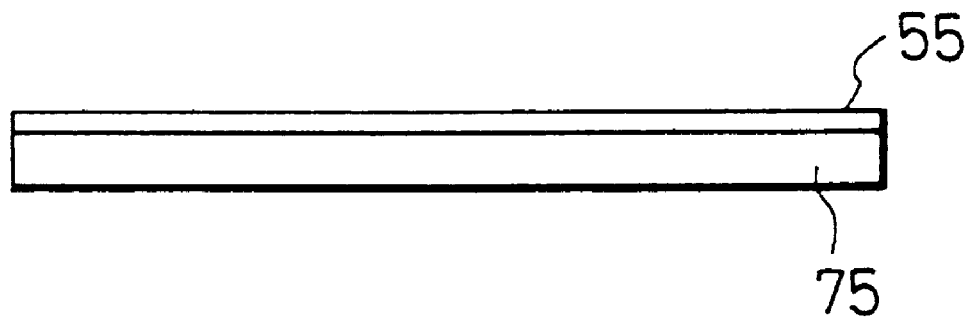

IMAGE FORMING APPARATUS

FIELD OF THE INVENTION

The present invention relates to an image forming apparatus for forming an image on a recording medium by allowing development particles to fly, that is applicable to a printing section of a digital copying apparatus and of a facsimile apparatus, a digital printer, a plotter, etc.

BACKGROUND OF THE INVENTION

Recently, as an image forming apparatus for outputting an image signal as a visible image onto a recording medium, such as paper, an image forming apparatus for directly forming a toner image on a recording medium by allowing toner, which is development particles, to fly so as to adhere to the recording medium is suggested (for example, Japanese Unexamined Patent Publication No. 6-155798/1994 (Tokukaihei 6-155798)). The following describes the above-mentioned conventional image forming apparatus in reference to FIGS. 15 and 16.

As shown in FIG. 15, the conventional image forming apparatus has an image forming section 51 having a toner supplying section 52, a printing section 53. The image forming apparatus allows toner 71 to fly so as to adhere onto a sheet 55 which is a recording medium. At the same time, the image forming apparatus controls the flying of the toner 71 based upon an image signal, an image is directly formed on the sheet 55.

The toner supplying section 52 is composed of a toner storing tank 70 where the toner 71 as negatively charged development particles is stored, and a toner holder 72 for holding the toner 71 by magnetic force. The toner holder 72 is grounded, and it rotates in the direction of the arrow "E" shown in FIG. 15 so that its speed on the surface is kept 30 mm/sec. The toner 71 is magnetic toner with average particle diameter of 10 $\mu$m, and it is charged by known technology so that the charging amount is $-4$ $\mu$C/g to $-5$ $\mu$C/g. Moreover, the toner 71 is held on the outer peripheral surface of the toner holder 72 so that a layer with an average thickness of 80 $\mu$m is formed.

The printing section 53 of the image forming section 51 has a counter electrode 75 composed of an aluminum tube with a diameter of 50 mm, and a control electrode 76 provided between the counter electrode 75 and the toner holder 72. The counter electrode 75 is provided so that the distance from the outer peripheral surface of the toner holder 72 becomes 1 mm. A voltage of 2 kV is applied to the counter electrode 75 by a high voltage power source 80, and it rotates in the direction of the arrow "F" shown in FIG. 15 so that its speed on the surface is 30 mm/sec. In other words, an electric field, which is necessary to allow the toner 71 held on the toner holder 72 to fly towards the counter electrode 75, is formed between the counter electrode 75 and the toner holder 72.

The control electrode 76 is parallel with a tangent plane of the outer peripheral surface of the counter electrode 75 and two-dimensionally spreads opposite to the counter electrode 75 so that the toner 71, which flies from the toner holder 72 towards the counter electrode 75, can pass the control electrode 76. The electric field formed between the toner holder 72 and the counter electrode 75 is changed by a potential supplied to the control electrode 76, and the flying of the toner 71 from the toner holder 72 to the counter electrode 75 is controlled.

The control electrode 76 is provided such that the distance from the outer peripheral surface of the toner holder 72 becomes 100 $\mu$m. The control electrode 76 is composed of a flexible print substrate (FPC) 76a with a thickness of 50 $\mu$m and ring electrodes 77 made of copper foil with a thickness of 20 $\mu$m. Gates 79 with diameter of 150 $\mu$m which is a passing section of the toner 71 is formed on the substrate 76a, and the ring electrodes 77 are provided around each gate 79. Each ring electrode 77 is electrically connected to a control power source section 81 via a feed line and a high voltage driver (not shown).

A voltage according to an image signal is applied to the ring electrodes 77 by the control power source section 81. In other words, in the case where the toner 71 held on the toner holder 72 is allowed to pass towards the counter electrode 75, the control power source section 81 applies a voltage of 200 V to the ring electrodes 77. Meanwhile, in the case where the toner 71 held on the toner holder 72 is not allowed to pass towards the counter electrode 75, the control power source section 81 applies a voltage of $-200$ V to the ring electrodes 77. In such a manner, when the applying voltage to the control electrode 76 is controlled according to an image signal and a sheet 55 is positioned on the counter surface on the counter electrode 75 to the toner holder 72, a toner image according to the image signal is directly formed on the surface of the sheet 55.

The following describes the electric field, which is formed between the toner holder 72 and the counter electrode 75 by applying voltage thereto. As mentioned above, since the toner holder 72 is grounded and a voltage of 2 kV is applied to the counter electrode 75, an equipotential surface in the range from 0 V to 2 kV is formed between the toner holder 72 and the counter electrode 75 at equal intervals. Since the counter electrode 75 is provided so that the distance from the outer peripheral surface of the toner holder 72 becomes 1 mm and the control electrode 76 is provided so that the distance from the outer peripheral surface of the toner holder 72 becomes 100 $\mu$m, a potential (Vc) of the center portion of the gates 79 on the control electrode 76 is 200 V.

In this state, a voltage (Ve) of 200 V is applied to the ring electrodes 77 on the control electrode 76 by the control power source section 81 so that the toner 71 held on the toner holder 72 is allowed to pass towards the counter electrode 75. Namely, the voltage is applied to the ring electrodes 77 so that Vc=Ve. Then, as shown in FIG. 16, the toner 71 flies in the perpendicular direction to the equipotential surface by a potential difference between the toner holder 72 and the counter electrode 75, and reaches the surface of the counter electrode 75, namely, the sheet 55. As a result, a dot having the same diameter as of the gates 79 (150 $\mu$m) is formed on the sheet 55. In other words, a dot diameter (FL) of an image (not shown) formed on the sheet 55 becomes equal to the diameter (dm) of the gates 79 (dm=FL).

The toner 71, which flew from a portion on the surface of the toner holder 72 which does not corresponds to the gates 79, cannot pass the gates 79, and adheres to the control electrode 76. In other words, the toner 71 which can pass the gates 79 is limited only to the toner 71 which flies from the portion corresponding to the gates 79 on the toner holder 72.

In above-mentioned conventional image forming apparatus, a diameter of a dot formed on the sheet 55 is equal to of the gates 79. In other words, resolution of an image formed on the sheet 55 is determined by the diameter of the gates 79. Consequently, in order to improve the resolution of an image in a conventional image forming apparatus, the diameter of the gates 79 on the control electrode 76 should be further minimized.

However, in order to further minimize the diameter of the gates 79 while reliability of an apparatus is maintained, namely, in order to manufacture the control electrode 76 so that the gates 79 having a smaller diameter are formed, a high-precision manufacturing technique is required. Accordingly, since yield of the control electrode 76 is lowered, cost rises. Therefore, in a conventional image forming apparatus, it is difficult to improve resolution of an image without a rise of its cost.

In order to minimize a diameter of a dot formed on sheet 55, it is considered that the distance between the control electrode 76 and the counter electrode 75 or a voltage to be applied to the counter electrode 75 is changed. However, if the distance or the voltage is changed, the state of the toner 71 flying towards sheet 55 is degraded, thereby causing a new problem of a deterioration in image quality, such as a distortion of a shape of a dot.

In addition, if a voltage is applied to the ring electrodes 77 so that Vc<Ve, after passing the gates 79, the toner 71 receives electric force due to an electric field adjacent to the gates 79, and the toner 71 spreads wider than the gates 79. Moreover, Coulomb's force (repulsive force), which is generated by charges of the toner 71, further widen the spread of the flying toner 71. Consequently, the toner 71 scatters and a diameter of a dot formed on sheet 55 becomes large. Accordingly, since toner density of a dot becomes low, sufficient toner density to form an image with good quality cannot be obtained. For this reason, a contrast becomes poor and contour becomes indistinct, so resolution of an image deteriorates.

In order to obtain sufficient toner density, it is necessary to make a toner layer (an amount of toner 71 held on the outer peripheral surface of the toner holder 72) thicker or to further increase the revolution rate of the toner holder 72. However, if the toner layer is made thicker, the uniformity of the toner layer and the uniformity and the stability of a charging amount of toner 71 are deteriorated. Moreover, if the revolution rate of the toner holder 72 is increased, vibration which is generated from the toner holder 72, a driving unit for driving the toner holder 72, etc. becomes large accordingly, thereby causing a new problem that the reliability of the apparatus is declined.

In addition, in order to obtain sufficient toner density, it is considered that time for continuously giving a potential, which allows the toner 71 to pass, to the control electrode 76 is made longer and to increase a flying amount of the toner 71. However, in this case, a time for forming an image becomes long. Consequently, an image forming speed is slowed down, and the toner 71 is remarkably scattered, thereby further deteriorating quality of an image.

In addition, in order to obtain resolution of 300 DPI (dot per inch), for example, it is necessary to adjust each dot diameter to approximately 150 $\mu$m. However, in a conventional image forming apparatus, in order to adjust each dot diameter to the above value, a diameter of gates 79 on control electrode 76 should be made smaller than at least the dot diameter, namely, 150 $\mu$m. Therefore, a high-precision manufacturing technique is required for manufacturing control electrode 76 in this manner, and accordingly, since yield of control electrode 76 is lowered, cost rises. Moreover, since a diameter of gates 79 becomes too small, the gates 79 become clogged with toner 71, thereby making it impossible to stably form an image with good quality on a sheet 55.

Since it is considered that a demand for the improvement of resolution is further increased from now on, if the above problem is solved only by improving accuracy, more difficulties are expected.

SUMMARY OF THE INVENTION

It is an object of the present invention to provide an image forming apparatus which is capable of forming an image of good quality on a recording medium by satisfactorily controlling flying of development particles and thus improving resolution of the image at a low price.

In order to achieve the above object, an image forming apparatus of the present invention has charged development particles, a holder for holding the development particles, a counter electrode provided opposite to the holder, a control electrode having a plurality of gates for allowing the flying development particles to pass which is provided between the holder and the counter electrode, an electric field forming section for forming an electric field for allowing the development particles to fly by generating a prescribed potential difference between the holder and the counter electrode and a controller for controlling a potential to be supplied to the control electrode for changing the electric field so as to control passage of said development particles through each gate. The image forming apparatus is characterized in that the controller controls the potential to be applied to the control electrode so that the potential becomes closer to a potential of the holder than a potential on center portions of the gates caused by the electric field formed by the electric field forming section when the development particles are allowed to pass the gates.

In accordance with the above arrangement, the controller controls the potential to be supplied to the control electrode having a plurality of gates for allowing the development particles to pass so that the potential becomes closer to a potential of the holder than the potential on the center portions of the gates caused by the electric field formed by the electric field forming section when the development particles are allowed to pass.

In order to achieve the above object, an image forming apparatus of the present invention has positively charged development particles, a holder for holding the development particles, a counter electrode provided opposite to the holder, a control electrode having a plurality of gates for allowing the flying development particles to pass which is provided between the holder and the counter electrode, an electric field forming section for forming an electric field for allowing the development particles to fly by generating a fixed potential difference between the holder and the counter electrode and a controller for controlling a potential to be supplied to the control electrode for changing the electric field and so as to control passage of the development particles through each gate. The image forming apparatus is characterized in that the controller controls the potential to be applied to the control electrode so that the potential becomes higher than a potential on center portions of the gates caused by the electric field formed by the electric field forming section when the development particles are allowed to pass the gates.

In accordance with the above arrangement, the controller controls the potential to be applied to the control electrode having a plurality of gates for allowing the positively charged development particles to pass so that the potential becomes higher than the potential on the center portions of the gates caused by the electric field formed by the electric field forming section when the development particles are allowed to pass the gates.

In order to achieve the above object, an image forming apparatus of the present invention has negatively charged development particles, a holder for holding the development particles, a counter electrode provided opposite to the holder, a control electrode having a plurality of gates for allowing the flying development particles to pass which is provided between the holder and the counter electrode, an electric field forming section for forming an electric field for allowing the development particles to fly by generating a fixed potential difference between the holder and the counter electrode and a controller for controlling a potential to be supplied to the control electrode for changing the electric field and so as to control passage of the development particles through each gate. The image forming apparatus is characterized in that the controller controls the potential to be applied to the control electrode so that the potential becomes lower than a potential on center portions of the gates caused by the electric field formed by the electric field forming section when the development particles are allowed to pass the gates.

In accordance with the above arrangement, the controller controls the potential to be applied to the control electrode having a plurality of gates for allowing the negatively charged development particles to pass so that the potential becomes lower than the potential on the center portions of the gates caused by the electric field formed by the electric field forming section when the development particles are allowed to pass the gates.

Consequently, in the above respective arrangements, the potential in the vicinity of the gates formed by the electric field forming section is changed by the controller so that intervals of an equipotential surface along the center axis of the gates becomes close when the development particles are allowed to pass the gates. Therefore, the development particles passing the gates receive electric force directing towards the center portion of the gate by the electric field in the vicinity of the gate. As a result, a fixed-shaped dot (namely, development particles adhering range) having a smaller diameter than the diameter of the gates, for example, is formed on a recording medium. Moreover, the dot formed on the recording medium has a clear outline, and since the development particles do not scatter, the dot can have sufficient density. Therefore, a clear image with high contrast can be obtained.

In addition, a diameter of a dot can be freely adjusted merely by controlling the potential to be applied to the control electrode. Consequently, since a diameter of a dot can be decreased without decreasing the diameter of the gates, quality of an image formed on a recording medium can be improved. Moreover, since the diameter of the dot can be freely adjusted without depending on the diameter of the gates, resolution of an image can be freely adjusted. Therefore, an image with high resolution can be formed without decreasing the diameter of the gates. Furthermore, since each dot can be adjusted so as to have a desired diameter, half tone can be expressed.

In addition, the diameter of each gate can be increased larger than a desired diameter of a dot. Therefore, even if the small diameter of the dot is required, an extremely high-precision manufacturing technique is not required for manufacturing the control electrode. Moreover, since the yield of the control electrode can be maintained equally to that of a conventional control electrode, its cost is not increased.

Consequently, it is possible to provide an image forming apparatus which is capable of forming an image with good quality on a recording medium by satisfactorily controlling flying of development particles and thus improving resolution of the image at a low price. Moreover, reliability of the apparatus can be improved.

In addition, in order to achieve the above object, an image forming apparatus of the present invention has charged development particles, a holder that holds the development particles and that has a surface movable at a fixed relative speed to a control electrode, a counter electrode provided opposite to the holder, a control electrode having a plurality of gates for allowing the flying development particles to pass, the control electrode provided between the holder and the counter electrode, an electric field forming section for forming an electric field for allowing the development particles to fly by generating a prescribed potential difference across the holder and the counter electrode and controller for changing a potential to be supplied to the control electrode with a fixed period for changing the electric field and so as to control passage of the development particles through each gate. The image forming apparatus is characterized in that the controller controls a time for continuously supplying a potential which allows the development particles to pass the control electrode so as to become longer than a time required for allowing the development particles held on positions on the surface of the holder corresponding to the gates, to fly.

In accordance with the above arrangement, an outline of a dot (namely, development particles adhering range) formed on a recording medium becomes clear and the dot has sufficient high development particle density. Namely, a clear image with high contrast can be formed on a recording medium.

In accordance with the above arrangement, it is desirable that the image forming apparatus further has the transfer unit for transferring the image formed on the counter electrode onto the recording unit.

As a result, even in the case where uneven materials with a coarse surface, such as wrinkled paper, a rear face of an envelope, are used as a recording medium, an image with good quality can bestably formed on such a recording medium.

In order to achieve the above object, an image forming apparatus of the present invention has charged development particles, a holder for holding the development particles, a counter electrode provided opposite to the holder, a control electrode having a plurality of gates for allowing the flying development particles to pass which is provided between the holder and the counter electrode, an electric field forming section for forming an electric field for allowing the development particles to fly by generating a prescribed potential difference across the holder and the counter electrode and a controller for controlling a potential to be supplied to the control electrode for changing the electric field and so as to control passage of the development particles through each gate. The image forming apparatus is characterized in that the controller controls the potential to be supplied to the control electrode so that the following equation (1) is fulfilled:

$$2qvP(S/\pi)^{1/2} \geq ((\pi MR^3 \tan\theta)/3) - qS \qquad \text{Equ. (1)}$$

where $q(g/cm^2)$ is a density of the development particles on the surface of the holder per unit area, $S(cm^2)$ is an area of a range where an electric field which makes the development particles possible to fly is formed, on the surface of the holder at substantial moment, $v(cm/sec)$ is a relative speed of the surface of the holder to the control electrode, $M(g/cm^3)$ is specific gravity of the development particles, $\theta(°)$ is an angle of repose of the development particles on the recording medium, $P(sec)$ is a time for continuously supplying the potential, which allows the development particles to pass, to the control electrode, and $2R(cm)$ is a maximum length of a range on the recording medium to which the development particles adhere at the substantial moment the potential starts to be supplied to the control electrode.

In accordance with the above arrangement, an outline of a dot (namely, development particle adhering range) formed on a recording medium becomes clear and the dot has sufficient high development particle density. Namely, a clear image with high contrast can be formed on the recording medium.

In addition, in the above arrangement, it is desirable that the controller controls the potential to be supplied to the control electrode so that the potential becomes a potential which can allow all the development particles held on the positions on the surface of the holder corresponding to the gates to fly.

As a result, a clearer image with higher contrast can be formed on the recording medium.

In order to achieve the above object, an image forming apparatus of the present invention has charged development particles, a holder for holding the development particles, a counter electrode provided opposite to the holder, a control electrode having a plurality of gates for allowing the flying development particles to pass which is provided between the holder and the counter electrode, an electric field forming section for forming an electric field for allowing the development particles to fly by generating a prescribed potential difference across the holder and the counter electrode, a controller for controlling a potential to be supplied to the control electrode for changing the electric field and so as to control passage of the development particles through each gate in order to allow the development particles to adhere to the counter electrode, and a transfer unit for transferring an image formed on the counter electrode onto the recording medium. The image forming apparatus is characterized in that the controller controls the potential to be supplied to the control electrode so that the following equation (1) is fulfilled:

$$2qvP(S/\pi)^{1/2} \geq ((\pi MR^3 \tan \theta)/3) - qS \qquad \text{Equ. (1)}$$

where $q(g/cm^2)$ is a density of the development particles on the surface of the holder per unit area, $S(cm^2)$ is an area of a range where an electric field which makes the development particles possible to fly is formed, on the surface of the holder at substantial moment, $v(cm/sec)$ is a relative speed of the surface of the holder to the control electrode, $M(g/cm^3)$ is specific gravity of the development particles, $\theta(°)$ is an angle of repose of the development particles on the counter electrode, $P(sec)$ is a time for continuously supplying the potential, which allows the development particles to pass, to the control electrode, and $2R(cm)$ is a maximum length of a range on the recording medium to which the development particles adhere at the substantial moment the potential starts to be supplied to the control electrode.

In accordance with the above arrangement, an outline of a dot (namely, development particle adhering range) formed on the counter electrode becomes clear, and the dot has sufficient high development particle density. Namely, a clear image with high contrast can be formed on the counter electrode. As a result, since the clear image with high contrast is transferred onto the recording medium by the transfer unit, the clear image with high contrast can be formed on the recording medium.

In order to achieve the above object, an image forming apparatus of the present invention has charged development particles, a holder for holding the development particles, a counter electrode provided opposite to the holder, a control electrode having a plurality of gates for allowing the flying development particles to pass which is provided between the holder and the counter electrode, an electric field forming section for forming an electric field for allowing the development particles to fly by generating a prescribed potential difference across the holder and the counter electrode, and controller for changing the electric field so as to control passage of the development particles through each gate. The image forming apparatus is characterized in that the control electrode has an insulating substrate, a first electrode layer formed on the holder side of the substrate to which a first potential is supplied and a second electrode layer formed on the counter electrode side of the substrate to which a second potential is supplied and in that when the developing particles are allowed to pass the gates, the controller controls the second potential so that the second potential becomes closer to the potential of the holder than a potential generated on the center portion of the gates by the electric field when a potential is not supplied to the second electrode layer.

In accordance with the above arrangement, when the developing particles held on the holder are allowed to pass the gates, the developing particles receive electric force directing towards the center portions of the gates due to the electric field in the vicinity of the gates. As a result, dots having prescribed shape and a smaller diameter than that of the gates can be formed on a recording medium, for example. Moreover, the dots formed on a recording medium have a clear outline and obtain sufficient density because the developing particles does not scatter, thereby obtaining a clear image with excellent contrast.

In addition, in the above arrangement, the developing particles can be allowed to pass the gates merely by controlling the second potential in the above manner, and the first potential may be a potential that allows the developing particles to fly. Moreover, the control can be made such that the developing particles fly or do not fly by changing a combination of potentials to be supplied to two electrode layers, namely, matrix control can be made. Therefore, a number of electrodes of the control electrode and of high voltage drives can be controlled, thereby easily providing higher resolution.

For fuller understanding of the nature and advantages of the invention, reference should be made to the ensuing detailed description taken in conjunction with the accompanying drawings.

BRIEF DESCRIPTION OF THE DRAWINGS

FIGS. 6(a) and 6(b) are explanatory drawings which explain image forming operations by the image forming apparatus: FIG. 6(a) is an explanatory drawing which explains steps of forming dots on a sheet by first flying toner; and FIG. 6(b) is an explanatory drawing which explains steps of forming dots on a sheet by second flying toner.

FIG. 8(a) is a waveform diagram of the potential which explains a time for continuously giving the potential, which allows the first flying toner to pass, to the control electrode; and FIG. 8(b) is a waveform diagram of the potential which explains a time for continuously giving a potential, which allows the toner to pass, to the control electrode.

FIG. 16 is an explanatory drawing which explains image forming operations by the conventional image forming apparatus.

DESCRIPTION OF THE EMBODIMENTS

Embodiment 1

The following describes one embodiment of the present invention with reference to FIGS. 1 through 11. The following description details an image forming apparatus having an arrangement in response to negatively charged toner, but when positively charged toner is used, polarity of each applying voltage may be set accordingly.

Figure 1:
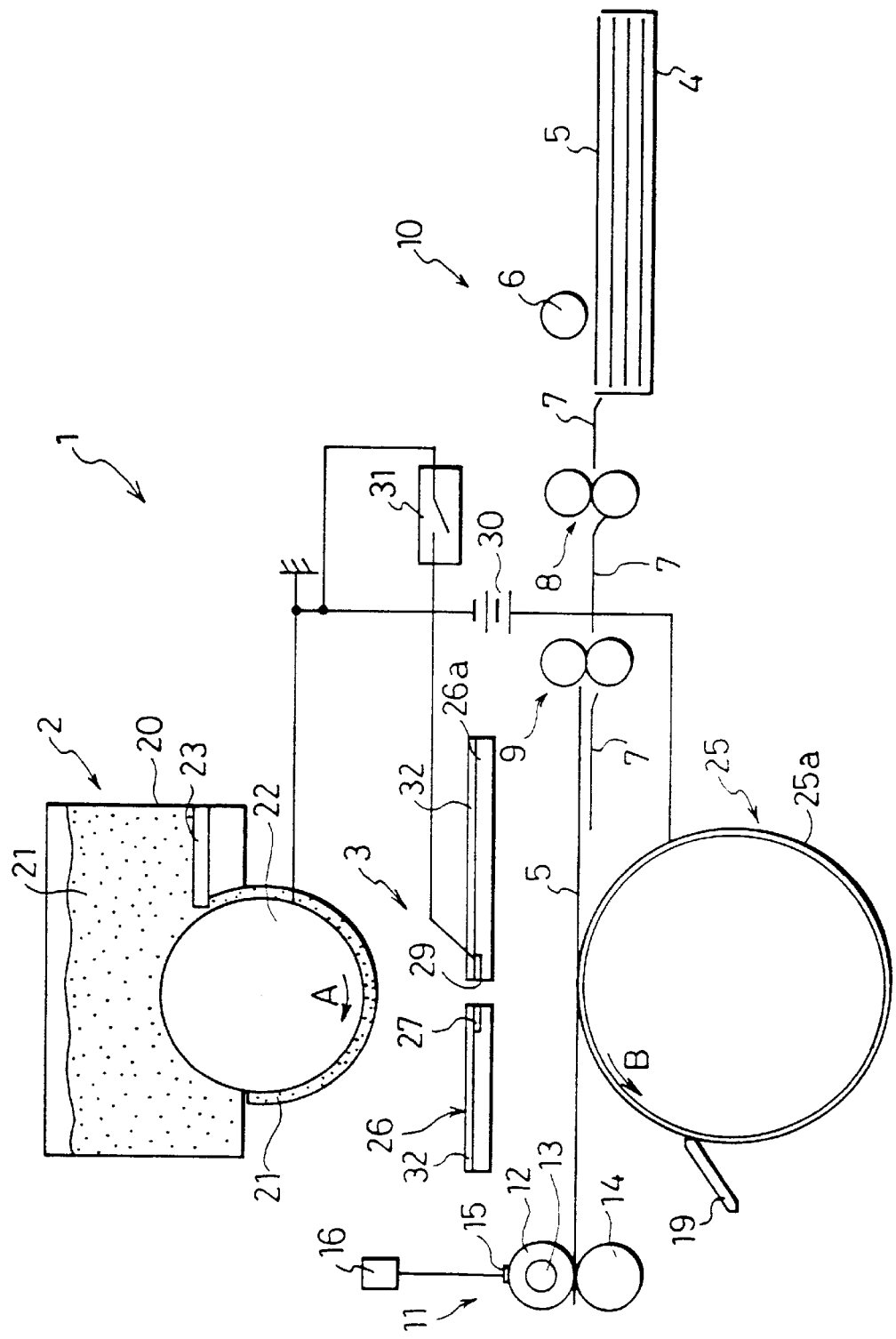
FIG. 1 is a schematic front view which shows an overall arrangement of an image forming apparatus in one embodiment of the present invention.

As shown in FIG. 1, an image forming apparatus of the present embodiment includes an image forming section 1 composed of a toner supplying section 2 and a printing section 3. The image forming section 1 develops an image according to an image signal on a sheet 5 which is a recording medium by using toner as development particles. In other words, in the image forming apparatus, toner is allowed to fly so as to adhere to a sheet 5, and the flying of the toner is controlled according to the image signal so that an image is directly formed on a sheet 5.

A sheet feeding unit 10 is provided to the sheet feeding side of the image forming section 1. The sheet feeding unit 10 is composed of a sheet cassette 4 for storing sheets 5 as recording media, a pickup roller 6 for sending out the sheets 5 from the sheet cassette 4, sheet feeding guides 7 for guiding the supplied sheets 5, a sheet feeding roller 8 for transporting the supplied sheets 5 and a register roller 9 for supplying the sheets 5 supplied from the sheet cassette 4 to the image forming section 1 at prescribed timing. Moreover, the sheet feeding unit 10 includes a sheet feeding sensor (not shown) for detecting that sheets 5 are supplied. The pickup roller 6, the feeding roller 8, and the register roller 9 are rotated by a driving unit, not shown.

In addition, a fixing section 11, which fixes a toner image formed on a sheet 5 in the image forming section 1 by heating and pressing on the toner image, is provided to the sheet discharge side of the image forming section 1. The fixing section 11 is composed of a heating roller 12, a heater 13, a pressing roller 14, a temperature sensor 15 and a temperature control circuit 16. The heating roller 12 is composed of an aluminum tube with a thickness of 2 mm, for example. The heater 13 is composed of a halogen lamp, for example, and it is included in the heating roller 12. The pressing roller 14 is composed of silicone resin, for example. Load of 2 kg, for example, is applied by a spring to both ends of each shaft of the heating roller 12 and the pressing roller 14, which are positioned opposite to each other, so that a sheet 5 is caught between and pressed by the heating roller 12 and the pressing roller 14. The temperature sensor 15 measures a temperature of the surface of the heating roller 12. The temperature control circuit 16 is controlled by a main control section (mentioned later). The temperature control circuit 16 controls an ON/OFF operation etc. of the heater 13 based upon the result measured by the temperature sensor 15, and maintains the surface of the heating roller 12 at a temperature of 150° C., for example. Moreover, the fixing section 11 includes a sheet discharge sensor (not shown) for detecting that a sheet 5 is discharged. Here, the materials of the heating roller 12, the heater 13, the pressing roller 14, etc. are not particularly limited. Moreover, the temperature of the surface of the heating roller 12 is not particularly limited. The fixing section 11 may be arranged so as to fix a toner image by heating or pressing on a sheet 5.

In addition, a sheet discharge roller (not shown) for discharging a sheet 5 processed in the fixing section 11 onto a sheet discharge tray and the sheet discharge tray (not shown) for receiving the discharged sheet 5 are provided to the sheet discharge side from the fixing section 11. The heating roller 12 and the pressing roller 14 and the sheet discharge roller are rotated by a driving unit, not shown.

The toner supplying section 2 of the image forming section 1 is composed of a toner storing tank 20 for storing toner 21 as development particles, a toner holder 22 as a cylindrical holder (sleeve) for holding toner 21 via magnetic force and a doctor blade 23 provided inside the toner storing tank 20 for charging toner 21 and for regulating a thickness of a toner layer held on the outer peripheral surface of the toner holder 22. The doctor blade 23 is provided to the side where the surface of the toner holder 22 rotates out of the toner storing tank 20 such that a distance from the outer peripheral surface of the toner holder 22 becomes 60 μm, for example. The toner 21 is magnetic toner with average particle diameter of 6 μm, for example, and charges are given to the toner 21 by the doctor blade 23 so that its charging amount becomes −4 μC/g to −5 μC/g, for example. The distance between the doctor blade 23 and the toner holder 22 is not particularly limited. Moreover, the average particle diameter and the charging amount of the toner 21 are not particularly limited.

The toner holder 22 is driven by the driving unit, not shown, and is rotated in the direction of the arrow "A" in FIG. 1 so that the speed on its surface becomes 30 mm/sec, for example. Furthermore, the toner holder 22 is grounded, and a magnet, not shown, is placed in a position inside the toner holder 22 which is opposite to the doctor blade 23 and a position inside the toner holder 22 which is opposite to a control electrode 26 (mentioned later). As a result, the toner holder 22 can hold toner 21 on its outer peripheral surface. The toner 21 held on the outer peripheral surface of the toner holder 22 forms magnetic brushes in the position on the outer peripheral surface which is opposite to the control electrode 26. The rotation speed of the toner holder 22 is not particularly limited. Moreover, the toner holder 22 may be arranged so as to hold toner 21 by only electric force or by both electric force and magnetic force instead of magnetic force.

Figure 2:
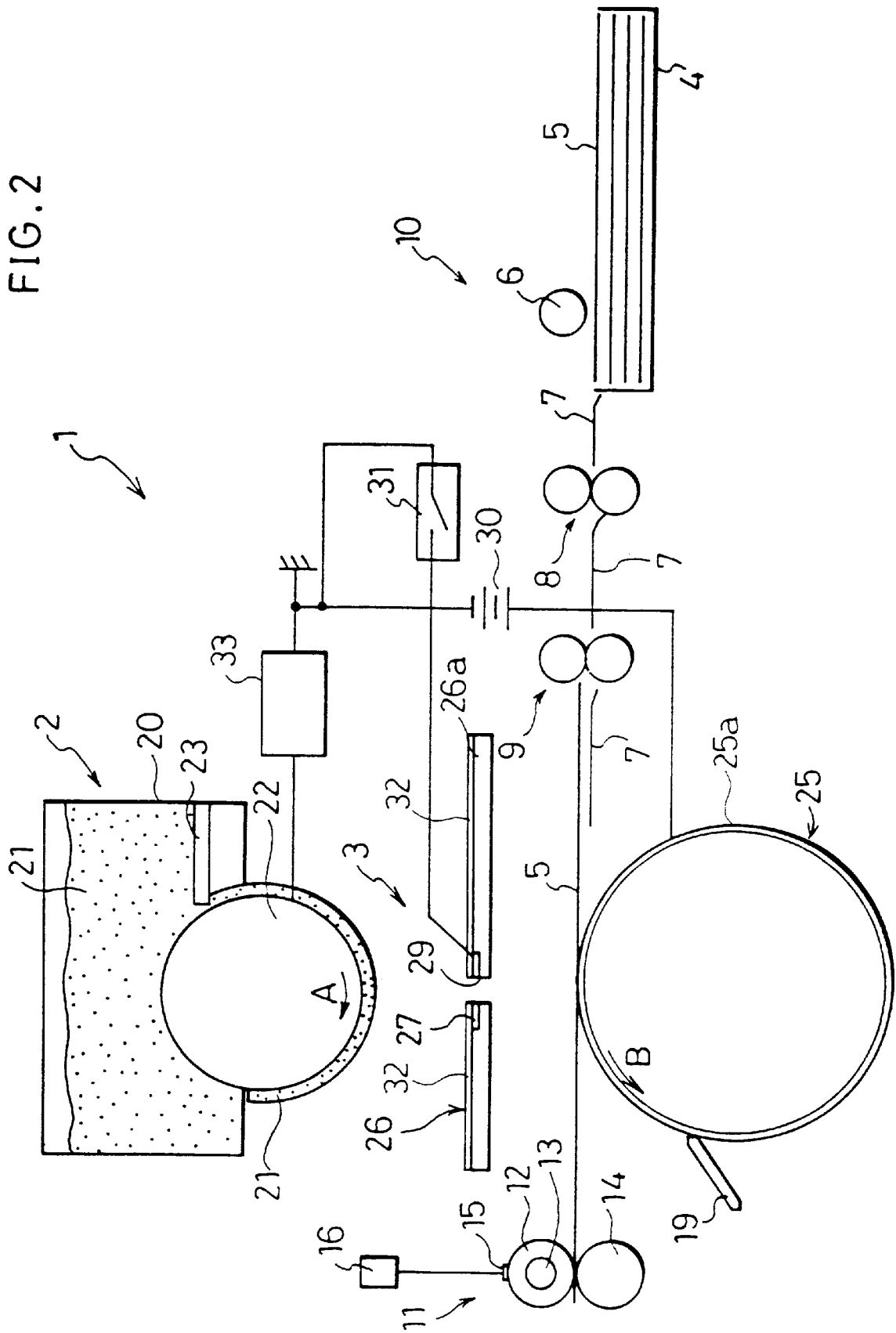
FIG. 2 is a plan view of an overall of the image forming apparatus in the case where an oscillating voltage is applied to a holder.

In addition, as shown in FIG. 2, for example, a power source section 33, which supplies an oscillating potential in the range that does not change a relationship with intensity of the potential on the counter electrode 25, such as an oscillating potential composed of DC component of 500 V and AC component of 500 V in the amplitude is supplied to the toner holder 22, may be provided. If a peak of the AC component (the potential difference where the counter electrode 25 becomes maximum) is a timewndow during which toner flies it is difficult that the toner to fly when the AC component is not at the peak. Therefore, the ability of the toner to fly can be improved, and to adherence of the toner to the control electrode 26 is prevented.

The printing section 3 of the image forming section 1 is composed of an aluminum tube with a diameter of 50 mm, for example, and it includes a counter electrode 25 which is opposite to the outer peripheral surface of the toner holder 22, the control electrode 26 provided between the counter electrode 25 and the toner holder 22 and a cleaning blade (cleaning means) 19. The counter electrode 25 is provided such that a distance from the outer peripheral surface of the toner holder 22 becomes 1 mm, for example.

A high resistant member 25a whose thickness is 100 µm is provided on the counter electrode 25, and its resistivity is $10^{13}$ Ω·cm. The high resistant member 25a is provided because if the surface of the counter electrode 25 is exposed, a dielectric breakdown occurs between the counter electrode 25 and the control electrode 26 or the toner holder 22 due to a high voltage of 2 kV of the counter electrode 25 and thus a discharge occurs. Furthermore, if a sheet 5 whose resistance becomes remarkably low under the condition of high temperatures and humidity contacts the counter electrode 25, and the counter electrode 25 approaches the control electrode 26 very closely due to use of a small sheet 5 with prescribed size, such as a postcard and an envelope, the counter electrode 25 with high voltage and the control power source section 31 are short-circuited. The high resistant member 25 prevents the above problems. Furthermore, the high resistant member 25 prevents breakage of PCU (Process Control Unit) and ICU (Interface Control Unit) due to leakage of a high voltage over the apparatus and prevents an operator from getting an electric shock.

The counter electrode 25 is driven by a driving unit, not shown, and is rotated in the direction of the arrow "B" in FIG. 1 so that a speed on its surface becomes 30 mm/sec. Moreover, a voltage of 2 kV, for example, is applied to the counter electrode 25 by a high voltage power source (electric field forming means) 30. In other words, an electric field, which is necessary to allow toner 21 held on the toner holder 22 to fly towards the counter electrode 25, is formed between the counter electrode 25 and the toner holder 22 by a voltage applied from the high voltage power source section 30 to the counter electrode 25.

The cleaning blade 19 is provided on a side where the surface of the counter electrode 25 is removed from a sheet 5 by its revolution so as to press against the counter electrode 25. When unforeseen accidents, such as jam of paper, occur and toner 21 is adhered to the surface of the counter electrode 25, the cleaning blade 19 removes the toner 21 so as to prevent the rear face of a sheet 5 which is opposite to the surface on which an toner image is formed from being stained with toner 21. A material of the counter electrode 25 is not particularly limited. The distance between the counter electrode 25 and the toner holder 22 is not particularly limited. Moreover, the rotation speed of the counter electrode 25 and a voltage applied to the counter electrode 25 are not particularly limited.

In addition, the image forming apparatus includes a main control section (not shown) as a control circuit for controlling the whole image forming apparatus, an image processing section (not shown) for converting image data obtained from an image reading apparatus for reading an image of a document, etc. into image data to be printed, an image memory (not shown) for storing the converted image data and an image forming control unit (not shown) for converting the image data obtained from the image processing section into image data to be given to the control electrode 26.

The control electrode 26 two-dimensionally spreads parallel with a tangent plane of the outer peripheral surface of the counter electrode 25 and opposite to the counter electrode 25 so that toner 21, which flies from the toner holder 22 towards the counter electrode 25, can pass the control electrode 26. Then, an electric field which is given between the toner holder 22 and the counter electrode 25 is changed by a potential to be supplied to the control electrode 26, and the flying of the toner 21 from the toner holder 22 to the counter electrode 25 is controlled.

Figure 3:
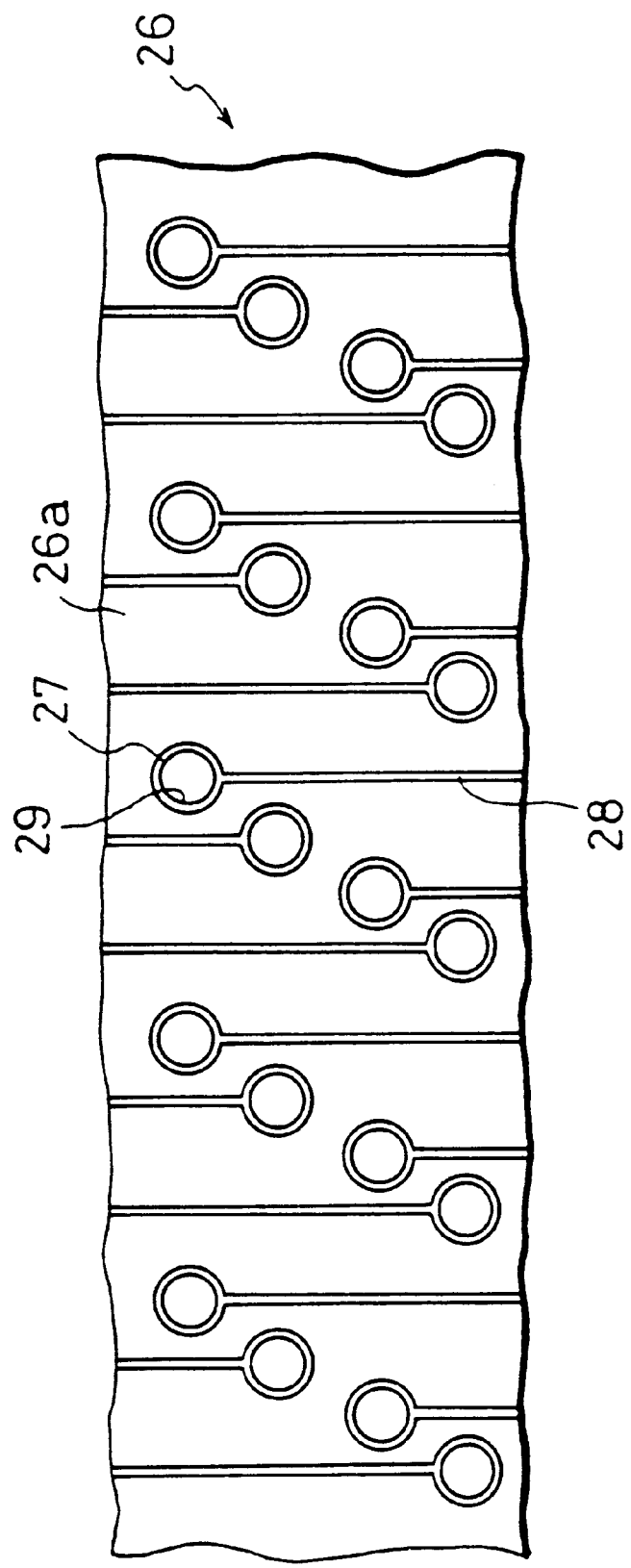
FIG. 3 is a plan view of a main section which shows an arrangement of a control electrode included in the image forming apparatus.

The control electrode 26 is provided such that the distance from the outer peripheral surface of the toner holder 22 becomes 100 µm, for example, and it is fixed by a supporting member, not shown. As shown in FIGS. 2 & 3, the control electrode 26 is composed of an insulating substrate 26a, a high voltage driver (not shown) and ring conductive materials which are independently separated, namely, ring electrodes 27. The substrate 26a is composed of polyimide resin and is formed so as to have a thickness of 25 µm. Moreover, holes which are gates 29, mentioned later, are formed on the substrates 26a. The ring electrodes 27, which are composed of copper foil, for example, are provided on the surface of the substrate 26a on the toner holder 22 side around the holes, and are placed according to a prescribed arrangement. Each ring electrode 27 is formed so as to have a diameter of 220 µm and a thickness of 30 µm, for example. Moreover, openings of each ring electrode 27 are formed so as to have a diameter of 200 µm, for example, and they are passing sections where toner 21 flying from the toner holder 22 to the counter electrode 25 passes. Hereinafter, the passing sections are referred to as gates 29. A distance between the control electrode 26 and the toner holder 22 is not particularly limited. A size of the gates 29, materials and thickness of the substrate 26a and of the ring electrodes 27, etc. is are not particularly limited.

2560 gates 29, namely, 2560 ring electrodes 27 are formed, and each ring electrode 27 is electrically connected to a control power source section 31 (mentioned later) via a feeder 28 and a high voltage driver (not shown). The above number of the ring electrodes 27 corresponds to resolution of 300 DPI (dot per inch) in a width of a letter-sized sheet. The number of the ring electrodes 27 is not particularly limited.

In addition, the surfaces of the ring electrodes 27 and of the feeders 28 are covered with an insulating layer 32 with a thickness of 30 m, thereby securing insulation between the ring electrodes 27, insulation between the feeders 28 and insulation between the ring electrodes 27 and the feeders 28 which are not connected.

The insulating layer 32 having resistivity of $10^{11}$ Ω·cm prevents a discharge between the counter electrode 25 and the toner holder 22 and also prevents a high voltage of the counter electrode 25 in the case where a sheet 5 whose resistance becomes remarkably low under the condition of high temperatures and humidity and a short circuit of the counter electrode 25 and the control power source 33. Moreover, the insulating layer 32 can prevents breakage of the ring electrode 27 with lowintensity by making a hard sheet, such as a cardboard, contact with the insulating layer 32.

When the resistivity of the insulating layer 32 is very high, the surface of the insulating layer 32 is charged by contact with the toner 21, etc., and thus a potential of several hundred V possibly occurs. For this reason, a potential of the control electrode 26 for controlling the toner 21 on the toner holder 22 becomes the sum of a charged potential on the insulating layer 32 and a potential supplied by the control power source section 31, and thus a desired potential cannot be obtained. As a result, the toner 21 cannot be normally controlled.

Therefore, it is necessary to lower the resistivity value of the insulating layer 32 to some degree. On the contrary, if the resistivity of the insulating layer 32 is too low, the insulating ability of the insulating layer 32 fails, and the control power source section 31 cannot be electrically protected. As a result, a current flows among the ring electrodes 27. For this reason, a capacity of the high voltage driver connected to the ring electrodes 27 should be made larger, so the apparatus becomes oversized and its cost rises. Furthermore, a suitable potential cannot be obtained due to a drop in an applying voltage to the control electrode 26.

The value of the resistivity ($10^{11}$ Ω·cm) of the insulating layer 32 is set allowing for the above problems. Here, a material, a thickness, etc. of an insulating layer are not particularly limited.

A pulse according to an image signal, namely a voltage, is applied to the ring electrodes 27 of the control electrode 26 by the control power source section (control means) 31. In other words, when toner 21 held on the toner holder 22 is allowed to pass the ring electrodes 27 towards the counter electrode 25, the control power source section 31 applies a voltage of 150 V, for example, to the ring electrodes 27. Meanwhile, when the toner 21 is not allowed to pass the ring electrodes 27, the control power source section 31 applies a voltage of –200 V, for example, to the ring electrodes 27. When an applying voltage to the control electrode 26 is controlled according to an image signal and a sheet 5 is positioned on the surface of the counter electrode 25 which is opposite to the toner holder 22, a toner image according to the image signal is formed on the sheet 5. The control power source section 31 is controlled by a control electrode control signal transmitted from an image forming control unit, not shown.

The following describes an image forming operation by the image forming apparatus of the present invention.

First, when a document to be copied is placed on an image reading section and a copy start button (not shown) is pressed, a main control section which has received this input starts the image forming operation. In other words, a document image is read by the image reading section, and its image data are processed by the image processing section so as to be stored in an image memory. Moreover, when a driving unit, not shown, is actuated, sheet 5 in the sheet cassette 4 is sent out to the image forming section 1 by the pickup roller 6 shown in FIG. 1 which is rotated by the driving unit, and the sheet feeding sensor detects the normal feeding state. Thereafter, the end of the sheet 5 contacts the register roller 9 and the sheet 5 temporarily stops.

If the normal feeding state is detected by the sheet feeding sensor, the image data stored in the image memory are transmitted to the image forming control unit. The image forming control unit starts to convert the inputted image data into a control electrode control signal to be given to the control electrode 26. Moreover, when receiving a prescribed amount of the control electrode control signal, the image forming control unit actuates the register roller 9 so as to transport the sheet 5 to the surface of the counter electrode 25 of the printing section 3 in the image forming section 1, which is opposite to the toner holder 22. The prescribed amount of the control electrode control signal varies with an arrangement, etc. of the image forming apparatus.

Thereafter, the image forming control unit supplies the control electrode control signal to the control power source section 31. The control electrode control signal is supplied at intervals which synchronize with supplying of the sheets 5 to the printing section 3 by the register roller 9. The control power source section 31 controls a voltage applied to each ring electrode 27 of the control electrode 26 based upon the control electrode control signal. In other words, when the voltage, which is appropriately applied from the control power source section 31 to the appointed ring electrode 27, is controlled to 150 V or –200 V, an electric field around the control electrode 26 is controlled. Namely, at the gates 29 of the control electrode 26, the flying of the toner 21 from the toner holder 22 to the counter electrode 25 is prevented or the prevention of the flying is released according to image data. As a result, a toner image according to an image signal is formed on the sheet 5 which is moving towards the discharge side at a speed of 30 mm/sec by the rotation of the counter electrode 25. Here, the control by the control power source section 31 is detailed later.

The sheet 5 where the toner image has been formed is transported to the fixing section 11, and the toner image is fixed on the sheet 5 by the fixing section 11. The sheet 5 where the toner image has been fixed is discharged onto the sheet discharge tray by the sheet discharge roller, and the normal discharge is detected by the sheet discharge sensor. According to the detecting operation, the normal completion of the printing operation is judged by the main control section.

A satisfactory image is formed on the sheet 5 by the above image forming operation. Since the image forming apparatus directly forms an image on a sheet 5, developers, such as a photoreceptor, a dielectric drum, which are used in a conventional image forming apparatus are not required. Consequently, a transferring operation for transferring an image from a developer onto a sheet 5 can be omitted, so a deterioration in an image does not occur. For this reason, reliability of the apparatus is, improved. Furthermore, since the arrangement of the apparatus is simplified and a number of components are reduced, miniaturization and lowering of a price are possible.

The following refers to the electric field between the toner holder 22 and the counter electrode 25, which is generated by a potential supplied between the toner holder 22 and the counter electrode 25. As mentioned above, the toner holder 22 is grounded, and the voltage of 2 kV is applied to the counter electrode 25. Therefore, equipotential surfaces of 0 V to 2 kV are formed between the toner holder 22 and the counter electrode 25 at constant intervals. The counter electrode 25 is provided so that a distance from the outer peripheral surface of the toner holder 22 becomes 1 mm, and the control electrode 26 is provided so that a distance from the outer peripheral surface of the toner holder 22 becomes 100 µm. Consequently, a potential of the center portions of the gates 29 on the control electrode 26 becomes approximately 200 V. The potential of the center portions of the gates 29 is determined by a potential difference across the toner holder 22 and the counter electrode 25, an arranging position of the control electrode 26, the shape of the gates 29, etc.

Figure 4:
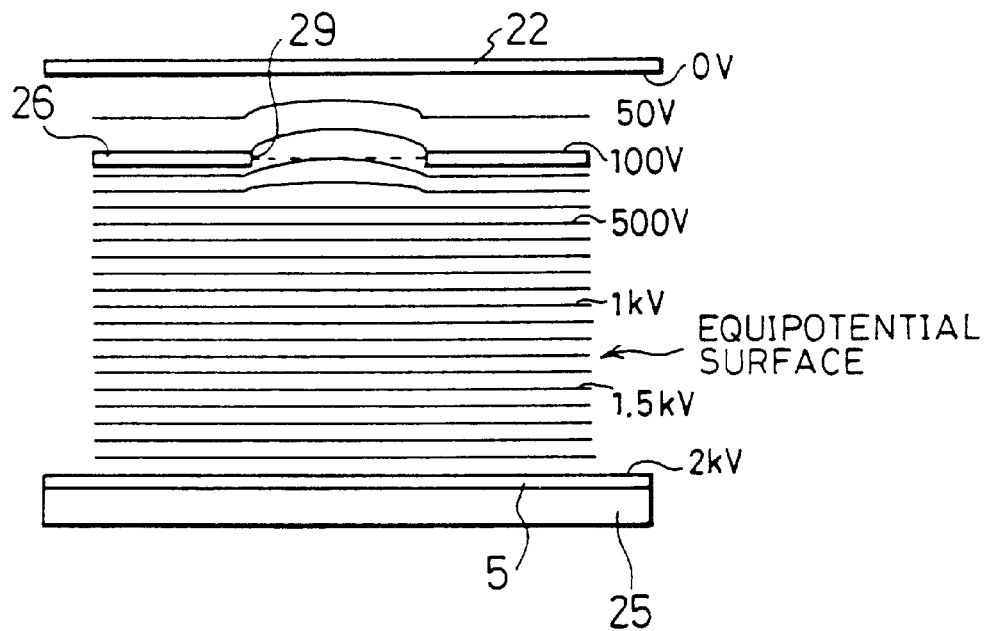
FIG. 4 is an explanatory drawing which explains an equipotential surface formed in an image forming section included in the image forming apparatus.

In order to allow the toner 21 held on the toner holder 22 to pass towards the counter electrode 25, a voltage of 150 V is applied to the ring electrodes 27 of the control electrode 26 by the control power source section 31. In other words, a potential (Ve), which is supplied to the control electrode 26 in order to allow the toner 21 pass, is made lower than a potential (Vc) of the center portion of the gates 29 caused by the potential difference across the toner holder 22 and the counter electrode 25 (Vc>Ve). Namely, the potential (Ve) supplied to the control electrode 26 is brought closer to a potential (OV) supplied to the toner holder 22. Then, as shown in FIG. 4, the equipotential surface near the gates 29 of the control electrode 26 swells, namely, is distorted towards the toner holder 22 in the vicinity of the center portions of the gates 29. The equipotential surface shown in FIG. 4 was obtained by a simulation using a computer by the inventor of the present invention.

Then, the toner 21 flies in the perpendicular direction to the equipotential surface by applying a voltage between the toner holder 22 and the counter electrode 25. For this reason, when the toner 21 held on the toner holder 22 passes the gates 29, the toner 21 receives electric force directing towards the center portions of the gates 29 due to the electric field in the vicinity of the gates 29. Therefore, the toner 21 which passes the gates 29 is collected on the center axis of the gates 29 by the electric force, and the toner 21 reaches the surface of the counter electrode 25, namely, a sheet 5 with the toner 21 collected on the center axis. As a result, a dot is formed with a fixed shape having a diameter (of 150 µm, for example) which is smaller than the diameter of the gates 29 (200 µm) is formed on the sheet 5. In other words, a dot diameter (FL) of an image (not shown) formed on the sheet 5 becomes smaller than the diameter (dm) of the gates 29 (dm>FL). Coulomb's force (repulsive force) is applied to each particles of the collected toner 21 in the direction in which the particles spread by electric charges of the toner 21. However, since the electric force directing towards the center portions of the gates 29 is applied to the toner 21, the spreading of the particles is controlled.

In addition, since the toner 21 reaches the sheet 5 with the toner 21 collected on the center axis of the gates 29 by the electric force, the toner 21 does not substantially scatter on the sheet 5. For this reason, the dot formed on the sheet 5 has a clear outline, and since the toner does not scatter, sufficient density can be obtained.

The above explanation refers to the case where the potential (Ve) of 150 V is supplied to the ring electrodes 27 of the control electrode 26 in order to allow the toner 21 to pass as one example. However, the potential (Ve) is not particularly limited as long as it is lower than the potential (Vc) of the center portions of the gates 29 caused by the potential difference across the toner holder 22 and the counter electrode 25. Degree of swelling of the equipotential surface in the vicinity of the gates 29 of the control electrode 26 can be changed by changing the potential (Ve). In other words, the electric force, which is applied to the toner 21 passing the gate 29, can be changed. For this reason, the dot diameter (FL) of an image formed on a sheet 5 can be freely adjusted by appropriately changing the potential (Ve) supplied by the control power source section 31. Namely, when the control power source section 31 is multivalue-controlled or analog-controlled according to a control electrode control signal, the dot diameter (FL) of an image formed on a sheet 5 can be freely controlled. For this reason, the dot diameter (FL) can be reduced merely by controlling the potential (Ve), thereby improving resolution and quality of an image formed on a sheet 5. Moreover, since a diameter (FL) of each dot of an image can be independently controlled, half tones can be expressed. Furthermore, since the dot diameter (FL) can be freely adjusted, the diameter of the gates 29 does not need to be adjusted to a desired dot diameter (FL). Therefore, the diameter of the gates 29 can be set to be larger than the dot diameter (FL).

The potential, which is supplied to the ring electrodes 27 of the control electrode 26 in order to prevent the passage of the toner 21, is not particularly limited. More specifically, the potential may be determined by making an experiment, for example.

The control power source section 31 changes the potential (Ve) supplied to the ring electrodes 27 of the control electrode 26 so that the following relationship is fulfilled.

Figure 5:
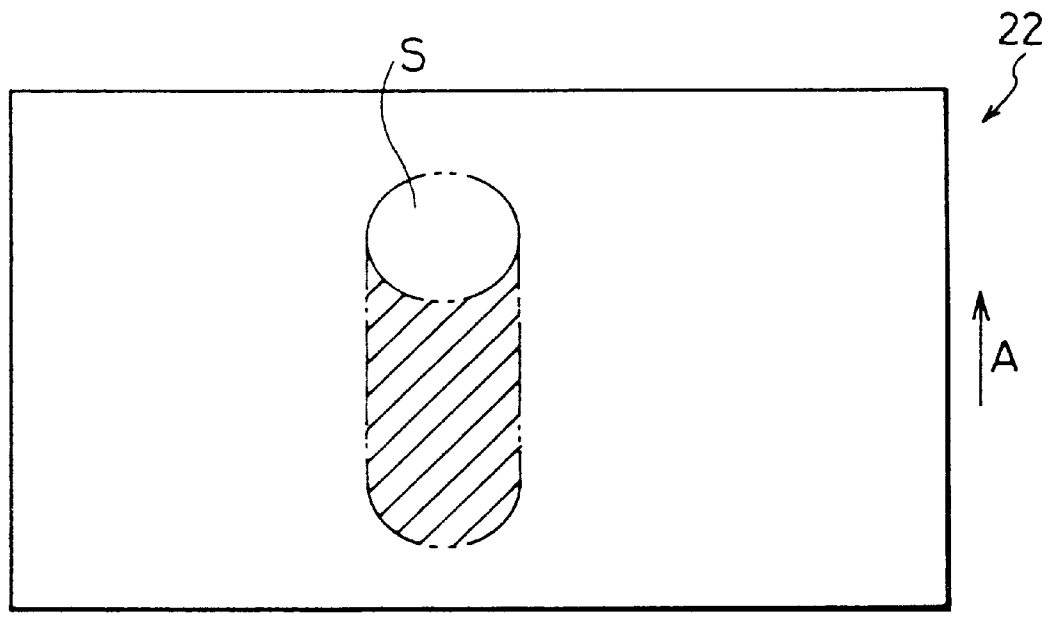
FIG. 5 is an explanatory drawing which explains an area of a range, where an electric field which can allow toner to fly is formed, on a surface of a toner holder included in the image forming apparatus.

Namely, when toner density per unit area on the surface of the toner holder 22 is q (g/cm$^2$), and an area of a range, where an electric field for allowing the toner 21 to fly is formed at a prescribed moment, is S (cm$^2$) as shown in FIG. 5, an amount of the toner 21, which can fly on the surface of the toner holder 22 at the moment the electric field is substantially formed (i.e. first flying toner 21$a$) is represented by qS(g).

Meanwhile, when a relative speed of the toner holder 22 to the control electrode 26 is represented by v (cm/sec), and time for continuously supplying a potential (Ve), which allows the toner 21 to pass the gates 29, to the ring electrodes 27 of the control electrode 26 is represented by P (sec), an area of a range, where an electric field for allowing the toner 21 held on the surface of the toner holder 22 to fly is formed within the time "P" (area of a range represented by hatching in FIG. 5), becomes $2vP(S/\pi)^{1/2}$(cm$^2$). Consequently, an amount of the toner 21 which can fly on the surface of the toner holder 22 within the time "P" (i.e. second flying toner 21$b$) is represented by $2qvP(S/\pi)^{1/2}$ (g).

In order to form a clear image with high contrast on a sheet 5, a dot formed on the sheet 5 must have a clear outline and sufficient high toner density. Since first flying toner 21$a$ slightly scatters on a sheet 5, a dot formed by the first flying toner 21$a$ may have a dim outline and may have a portion where the toner density is low. Therefore, in order to satisfy these conditions, the dot formed on the sheet 5 by the first flying toner 21$a$ shown in FIG. 6($a$) is covered with the second flying toner 21$b$ as shown in FIG. 6($b$).

When specific gravity of the toner 21 is represented by M (g/gm$^3$), an angle of repose of the toner 21 on a sheet 5 is represented by θ (°) and a maximum length of a dot (a range where development particles adhere) formed on a sheet 5 by the first flying toner 21$a$ is represented by 2R (cm), an amount of the toner 21 required for covering the dot formed by the first flying toner 21$a$ is represented by $((\pi MR^3 \tan \theta)/3) - qS$ (g). The maximum length shows a length including a range where the dot is formed by the first flying toner 21$a$ which slightly scattered on the sheet 5. Moreover, a transporting speed of a sheet 5 is slow enough to ignore compared with a relative speed "v". In other words, a transporting distance of a sheet 5 within the time "P" is short enough to ignore. Consequently, it is considered that a sheet 5 is at rest.

Therefore, in order to cover the dot formed by the first flying toner 21a with the second flying toner 21b, the following equation (1) is fulfilled:

$$2qvP(S/\pi)^{1/2} \geqq ((\pi MR^3 \tan\theta)/3) - qS \qquad \text{Equ. (1)}$$

As mentioned above, the control electric power source section 31 controls the potential (Ve) supplied to the ring electrodes 27 of the control electrode 26, that is, the time "P" for continuously supplying the potential (Ve) so that the above Equation (1) is fulfilled.

For example, when the toner density "q" is $1.2 \times 10^{-3}$ g/cm$^2$, the area "S" is $3 \times 10^{-4}$ cm$^2$, the relative speed "v" is 3 cm/sec, the specific gravity "M" is 1 g/cm$^3$, the angle of repose $\theta$ is 20° and the maximum length "2R" is $2 \times 10^{-2}$ cm, the right side of the Equ. (1) becomes as follows:

$$((\pi MR^3 \tan\theta))/3 - qS = \left[\pi \cdot 1 \cdot (1 \times 10^{-2})^3 \cdot \tan 20\right]/3 - 1.2 \times 10^{-3} \cdot 3 \times 10^{-4}$$
$$\cong 2 \times 10^{-8} \text{ g}.$$

Therefore, when the time "P" is $5 \times 10^{-4}$ sec, the left side of the Equation (1) becomes as follows:

$$2qvP(S/\pi)^{1/2} = 2 \cdot 1 \cdot 2 \times 10^{-3} \cdot 3 \cdot 5 \times 10^{-4} \cdot$$
$$\left(3 \times 10^{-4} \cdot (3 \times 10^{-4}/\pi)^{1/2}\right)$$
$$\cong 4 \times 10^{-8} \text{ g},$$

so that the Equation (1) is fulfilled. In other words, the control power source section 31 may control the time "P" for continuously supplying the potential (Ve) to the ring electrodes 27 of the control electrode 26 so as to be $5 \times 10^{-4}$ sec, for example.

As a result, since the first flying toner 21a which slightly scattered on a sheet 5 can be covered, a dot formed on the sheet 5 has a clear outline and the sufficient high toner density. Namely, a clear image with satisfactory contrast can be formed on the sheet 5.

Incidentally, the control power source section 31 is arranged such that a potential (Ve) of 150 V is supplied to the ring electrodes 27 of the control electrode 26 in order to allow the toner 21 to pass. The potential (150 V) makes it possible to allow all the toner 21 held on the positions of the surface of the toner holder 22 corresponding to the gates 29 to fly. A potential (Ve) supplied to the ring electrodes 27 of the control electrode 26 can be determined easily by making an appointed experiment. One example of the experiment is mentioned below.

In this experimental example, conditions which determine the potential (Ve) were set as follows. A distance between the counter electrode 25 and the outer peripheral surface of the toner holder 22 was 1 mm, a distance between the control electrode 26 and the outer peripheral surface of the toner holder 22 was 0.1 mm, an applying voltage to the counter electrode 25 was 2.5 kV and a diameter of the gates 29 Was 300 μm. Moreover, as the toner 21, pulverized toner in which main additive is silica, an average particle diameter is 6 μm, specific gravity is 0.52 g/cm$^3$, an angle of repose is 45° and a charging amount is $-3$ μC/g to $-5$ μC/g was used.

When the potential (Ve) supplied to the ring electrodes 27 of the control electrode 26 was a variable, a potential (Vth) which males the toner 21 held on the toner holder 22 start to fly towards the counter electrode 25 and a potential (Vs) which can allow all the toner 21 held on positions on the toner holder 22 corresponding to gates 29 to fly were measured. Moreover, the surface of the counter electrode 25, namely, a state of a dot formed on a sheet 5 was estimated when the measurement was taken. As to whether all the toner 21 held on the toner holder 22 flew or not, the surface of the toner holder 22 was estimated by visually ascertaining whether the toner 21 did not remain at all.

Figure 7:
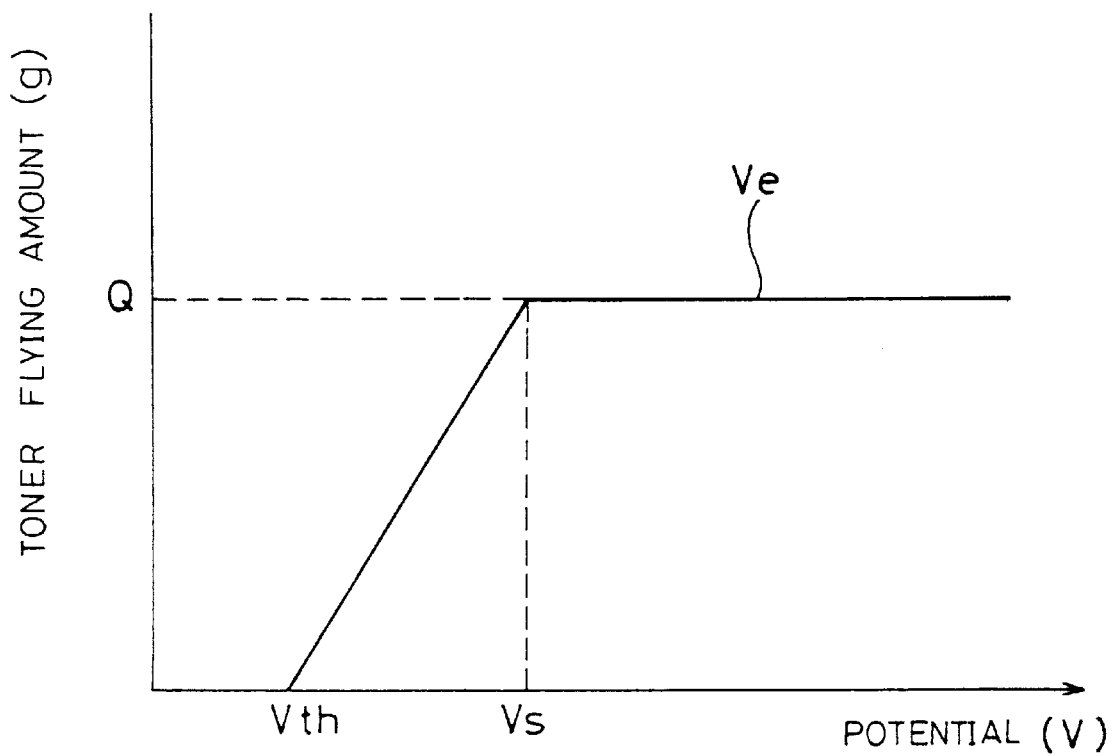
FIG. 7 is a graph which shows a result of an experiment for determining a potential (Ve) supplied to the control electrode.

Under the above conditions, the potential (Ve) was variously changed, so that the flying state of the toner 21 held on the toner holder 22 was estimated, and the state of the formed dot was evaluated. The results are shown in Table 1 and FIG. 7. In Table 1, a state in which the toner 21 does not remain at all on the toner holder 22 is represented by ○, a state in which the toner 21 partially remains on the toner holder 22 is represented by Δ and a state such that the toner 21 remains on the toner holder 22 is represented by x. Moreover, a case where the state of dot formed on a sheet 5 is satisfactory is represented by ○, a case where the state of dot is partially satisfactory by Δ and a case where the state of dot is unsatisfactory by x. In FIG. 7, a relationship between the potential (V) and an amount of flying toner (g) is exhibited graphically by using (V) to enter the horizontal axis and using (g) to enter the vertical axis. Q(g) of the graph shows an amount of toner in the case where all the toner 21 completely flies.

TABLE 1

| | Potential of Control Electrode (Ve) (V) | | | | | | |
|---|---|---|---|---|---|---|---|
| | 0 | 50 | 100 | 150 | 200 | 250 | 300 |
| State of surface of toner holder | x | Δ | Δ | ○ | ○ | ○ | ○ |
| State of dot | x | Δ | Δ | ○ | ○ | ○ | ○ |

According to the above results, the potential (Vth) which make the toner 21 held on the toner holder 22 start to fly towards the counter electrode 25 was 50 V, and the potential (Vs) which allow all the toner 21 held on the position of the toner holder 22 corresponding to the gates 29 to fly was 150 V. As a result, under the above conditions, the potential (Ve) supplied to the ring electrodes 27 of the control electrode 26 is not less than 150 V. Here, under the above conditions, since the potential (Vc) of the center portions of the gates 29 caused by the potential difference across the toner holder 22 and the counter electrode 25 becomes 250 V, the potential (Ve) supplied to the ring electrodes 27 of the control electrode 26 may be set for 150 V to 250 V. As a result, a clear image with higher contrast can be formed on a sheet 5.

In addition, the control power source section 31 may control the time "P" for supplying the potential (Ve) to the ring electrodes 27 of the control electrode 26 as follows so that the equation (1) is fulfilled instead of controlling the potential (Ve).

In other words, if the image forming apparatus is capable of processing letter-sized sheets at a speed of 6 sheets/min, for example, the transporting speed of the sheets 5 on the counter electrode 25 becomes approximately 30 mm/sec. If resolution is 300 DPI,), a processing time required for forming one dot of an image formed on a sheet 5, namely, a period "T" (shown in FIG. 8(a)) of a pulse applied from the control power source section 31 to the ring electrodes 27 according to an image signal becomes approximately 2.8×

$10^{-3}$ sec. When the diameter of the gates 29 is dm (cm) and the relative speed of the toner holder 22 to the control electrode 26 is v (cm/sec), dm/v<T is satisfied.

Meanwhile, a time required for allowing all the toner 21, which is held on the positions on the toner holder 22 corresponding to the gates 29, to fly, namely, a time required for supplying a potential to the control electrode 26 in order to allow the first flying toner 21a to pass is t (sec). "t" is related to "T" by t<T.

Figures 8A, 8B:
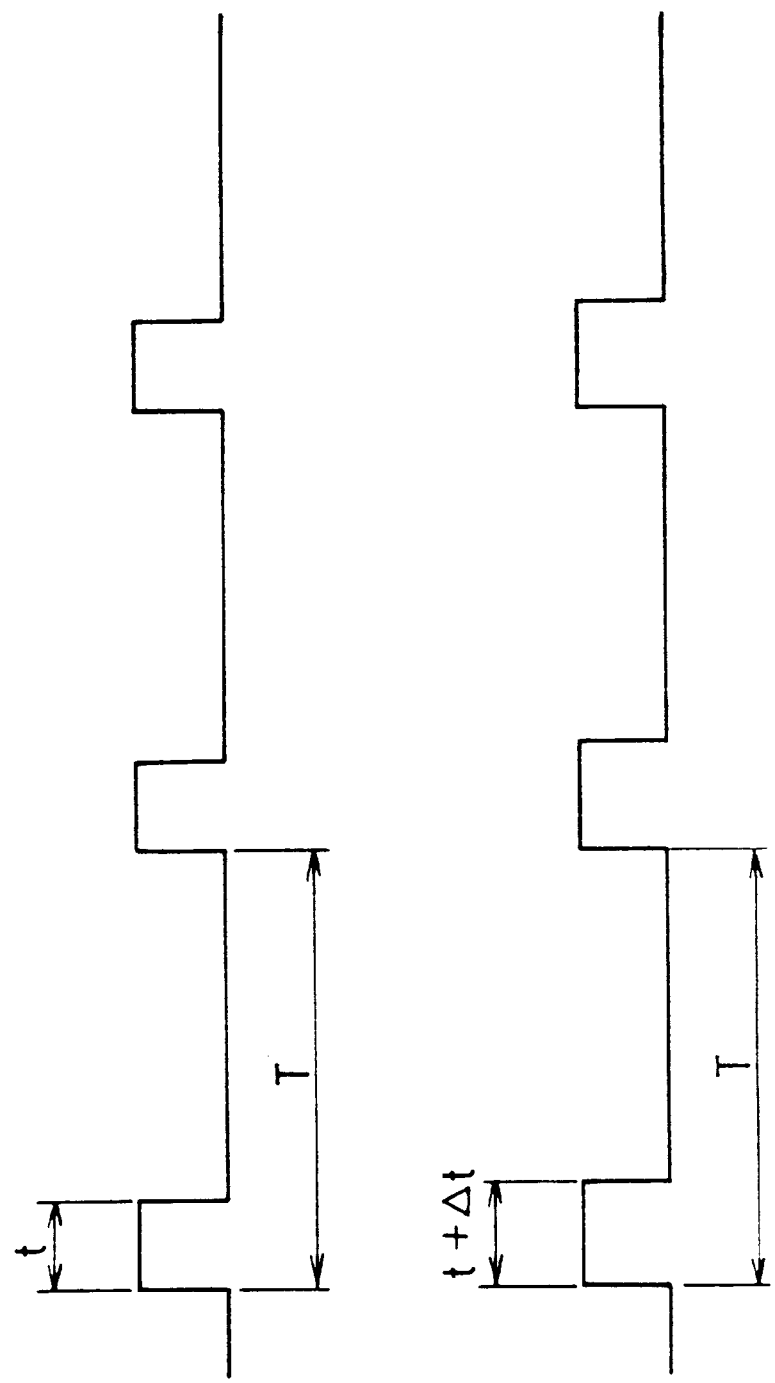
FIGS. 8(a) and 8(b) are explanatory drawings which explain another image forming operations by the image forming apparatus.

In order to form a clear image with satisfactory contrast on a sheet 5, a dot formed on the sheet 5 should have sufficiently high density. Therefore, in order to heighten the toner density, more toner 21 is allowed to fly to a dot formed on a sheet 5 by the first flying toner 21a so that the toner 21 is superimposed on the dot. In other words, as shown in FIG. 8(b), the control power source section 31 may control the time for continuously supplying the potential (Ve) to the control electrode 26 in order to allow the toner 21 to fly so that the time becomes longer than the time "t" by Δt (sec), for example.

When the time for supplying the potential (Ve) becomes longer by t (sec), the toner 21 held on a position on the surface of the toner holder 22 which does not correspond to the gates 29 moves to the position corresponding to the gates 29 by the revolution of the toner holder 22, and the toner 21 passes the gates 29 so as to reach a sheet 5. In other words, when the time for supplying the potential (Ve) is extended by Δt (sec), the toner 21 is superimposed on the dot formed on the sheet 5 by the first flying toner 21a.

As a result, the dot formed on the sheet 5 has a clear outline and sufficiently high toner density. Namely, a clear image with satisfactory contrast can be formed on the sheet 5. However, since the time (t+Δt) for continuously supplying the potential (Ve) should be shorter than the period "T", (t+Δt)<T is satisfied.

As mentioned above, in the image forming apparatus of the present embodiment, in order to allow the negatively charged toner 21 to pass the gates 29, the control power source section 31 controls the potential (Ve) supplied to the ring electrodes 27 of the control electrode 26 so that the potential (Ve) becomes lower than the potential (Vc) on the center portions of the gates 29 caused by the potential difference across the toner holder 22 and the counter electrode 25 (Vc>Ve).

For this reason, when the toner 21 held on the toner holder 22 passes the gates 29, the toner 21 receives the electric force directing to the center portions of the gates 29 due to the electric field in the vicinity of the gates 29. As a result, a dot with a prescribed shape having a smaller diameter than that of the gates 29 is formed on a sheet 5. Moreover, since the dot formed on the sheet 5 has a clear outline and the toner 21 does not scatter, the dot has sufficient density. Consequently, a clear image with satisfactory contrast can be obtained.

The resolution and the quality of the image formed on the sheet 5 can be improved merely by controlling the potential (Ve), and half tone can be expressed. Furthermore, since the dot diameter (FL) can be freely adjusted, the diameter of the gates 29 can be larger than the desired dot diameter (FL). Therefore, an extremely high-precision manufacturing technique is not required for manufacturing the control electrode 26. Moreover, since the yield of the control electrode 26 can be maintained equally to that of a conventional control electrode, its cost is not increased.

For this reason, when the flying of the toner 21 is satisfactorily controlled, an image with good quality is formed on a sheet 5 and an image forming apparatus which can improve the resolution of the image can be provided at a low price. Furthermore, the reliability of the apparatus can be improved.

Furthermore, since the diameter of the gates 29 can be larger than the desired dot diameter (FL), even in the case where the dot diameter (FL) is small, the gates 29 are not clogged with the toner 21. In other words, since clogging due to the toner 21 does not occur on the gates 29, even after the apparatus is used frequently or for a long time, the flying of the toner 21 can be stably controlled by the control electrode 26, thereby making it possible to stably form an image with good quality on a sheet 5.

In addition, in the image forming apparatus of the present embodiment, as mentioned above, the control power source section 31 controls the time "P" for continuously supplying the potential (VE) to the ring electrodes 27 of the control electrode 26 so that the Equation (1) is fulfilled instead of controlling the potential (Ve).

As a result, since the first flying toner 21a which slightly scattered on a sheet 5 can be also covered, a dot formed on the sheet 5 has a clearer outline, and the toner density of the dot becomes sufficiently high. Namely, a clearer image with more satisfactory contrast can be formed on a sheet 5.

The present embodiment detailed the image forming apparatus having an arrangement which is in response to negatively charged toner, but in the case where positively charged toner is used, polarity of each applying voltage is set accordingly, thereby showing same functions and effects as those of the above. In this case, a control power source section may control a potential (Ve), which is supplied to a control electrode in order to allow toner to pass, so that the potential (Ve) becomes higher than a potential (Vc) on center portions of gates caused by a potential difference across a toner holder and a counter electrode (Vc<Ve).

The present embodiment describes the case where development particles are toner as one example, but development particles may be ink, etc. Moreover, the present embodiment describes the case where the control electrode 26 has the ring electrodes 27 as one example, but the arrangement of the control electrode 26 is not particularly limited.

Figure 9:
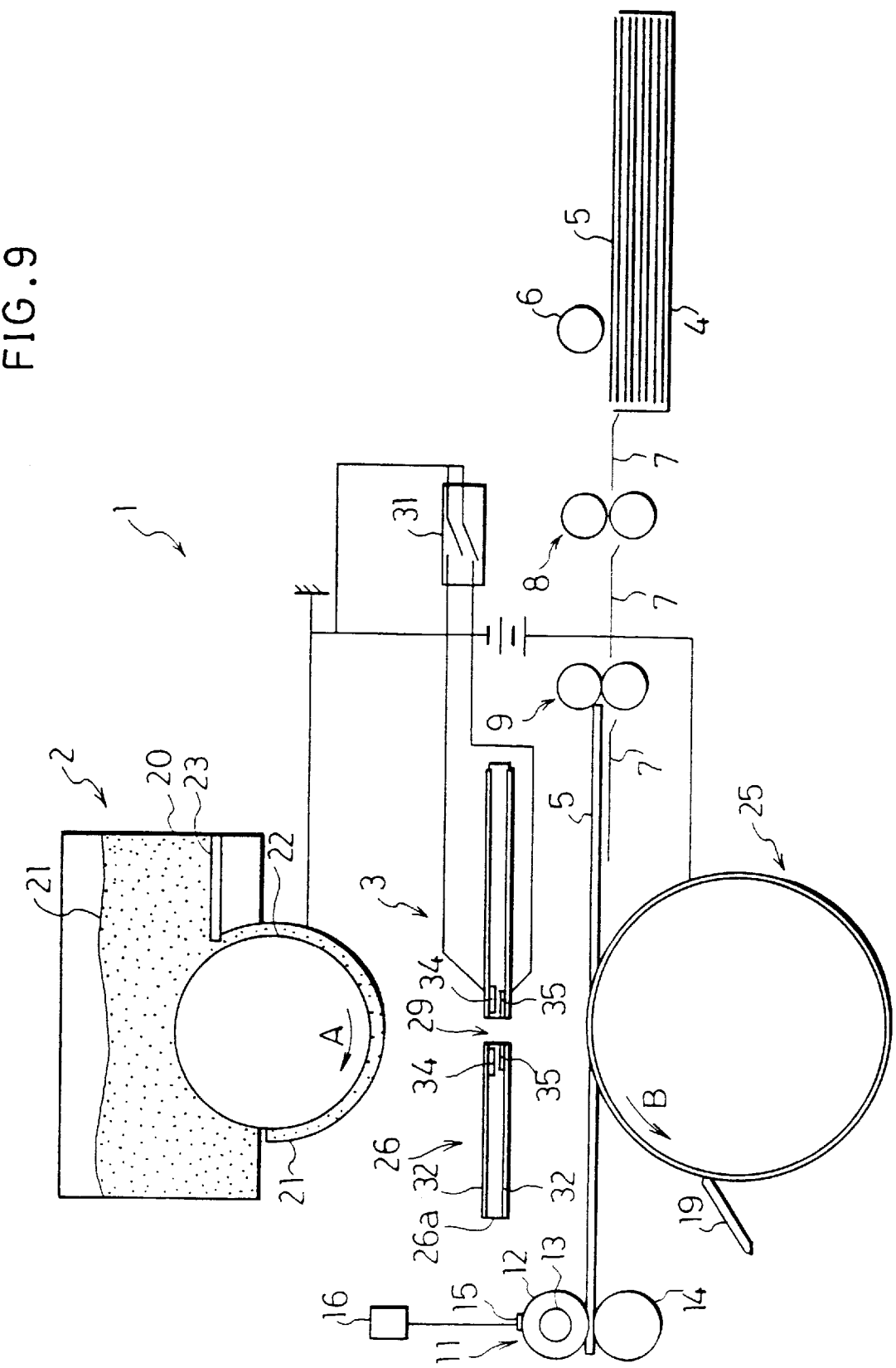
FIG. 9 is a schematic front view which shows an overall arrangement of an image forming apparatus shown in FIG. 1 in the case a control electrode is a matrix control system.
Figure 10:
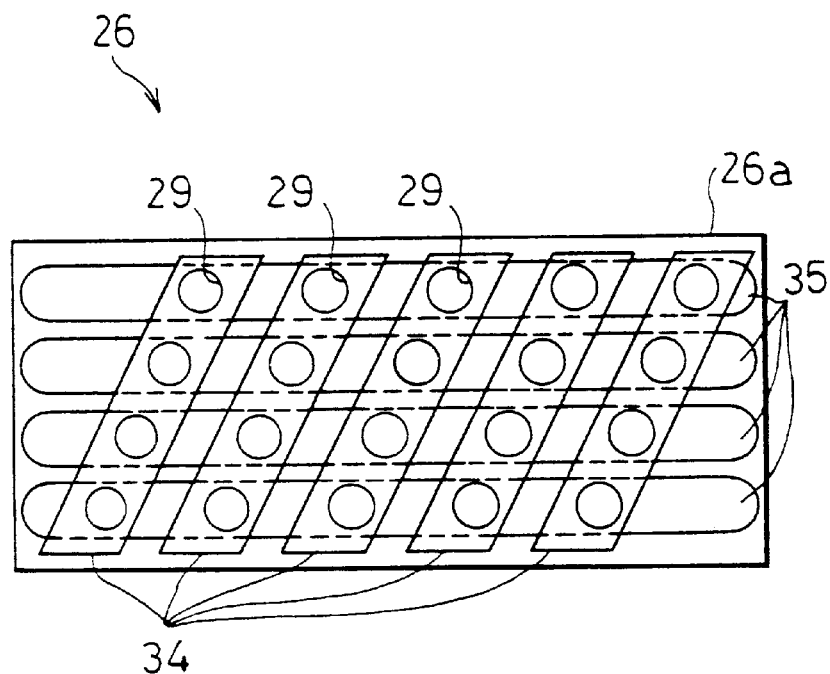
FIG. 10 is a front view of a main section which shows an arrangement of the control electrode used for the matrix control system.

As shown in FIGS. 9 and 10, the control electrode 26 may be arranged such that instead of the ring electrodes 27, zonal electrodes 34 (first zonal electrodes) and, zonal electrodes 35 (second zonal electrodes) are provided on both faces of the substrate 26a of the control electrode 26 with them intersecting each other, namely, in matrix-like arrangement. In accordance with this arrangement, a potential supplied to the zonal electrodes 34 and 35 is controlled so that the flying of the toner 21 from the toner holder 22 to the counter electrode 25 is controlled.

In this arrangement, the potential supplied to the control electrode becomes the sum of a potential supplied to the zonal electrodes 34 (first potential) and a potential supplied to the zonal electrode 35 (second potential). In this case, the sum may be controlled, but at least the potential supplied to the zonal electrode 35 may fulfill the aforementioned conditions. In other words, in order to allow the toner 21 to pass, the potential supplied to the zonal electrode 35 may be controlled so as to become closer to the potential of the toner holder 22 than the potential that is generated at the center portion of the gates 29 due to the potential difference across the toner holder 22 and the counter electrode 25.

In the case where an electrode and a high voltage drive are provided to one opening like a conventional arrangement, in a printer which is capable of printing on a sheet whose maximum size is a letter size in its longitudinal direction, for example, 2560 electrodes and drivers are needed in order to improve resolution to 300 DPI, and 5120 electrodes and drivers are needed in order to improve resolution to 600 DPI. For this reason, wiring and arranging space becomes large, so an apparatus with this arrangement may be physically impossible. Needless to say, its costs are increased.

Figure 11:
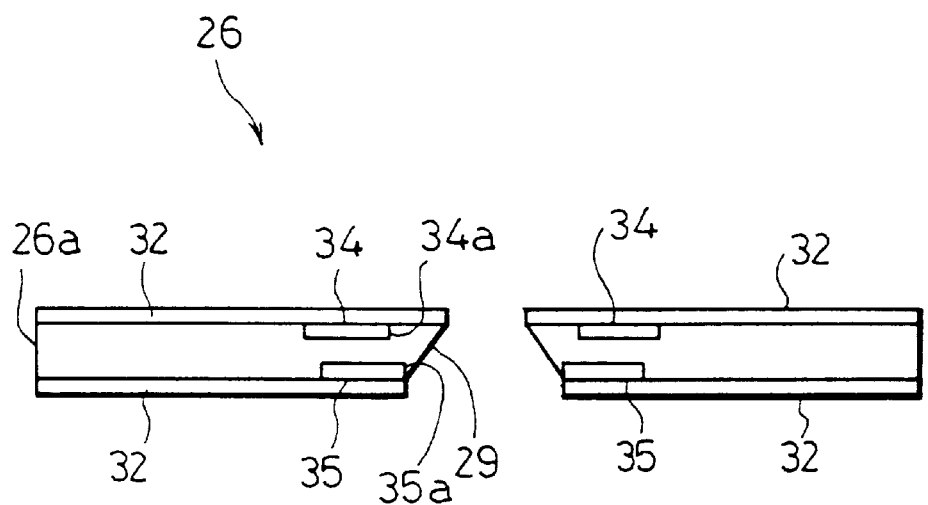
FIG. 11 is a cross section which shows an arrangement in the vicinity of gates of the control electrode.

In accordance with the above arrangement, a number of electrodes and high voltage drivers on the control electrode 26 can be decreased. Moreover, as a number of gates 29 is further increased, the number of electrodes and high voltage drivers can be further decreased, thereby fulfilling recent need for high resolution. Moreover, miniaturization and lowering of an apparatus can be realized without deteriorating quality of an image. In the above arrangement, as shown in FIG. 11, when openings 35a of the zonal electrodes 35 on the counter electrode 25 side are smaller than openings 34a of the zonal electrodes 34 on the toner holder 22 side, effects of the insulating layer 32 can be easily obtained. Furthermore, when the openings on the toner holder 22 side are smaller than the openings on the counter electrode 25 side, clogging due to toner 21 does not easily occur on the substrate 26a.

Furthermore, the toner supplying section 2 can be arranged such that the ion-flow method is applied. Namely, the image forming section may be arranged so as to include an ion source, such as a corona electrical charger. In this case, the same functions and effects as of the above can be shown.

The image forming apparatus of the present invention can be suitably applied to printing sections of a digital copying apparatus and a facsimile machine, a digital printer, plotter, etc., for example.

Embodiment 2

Figure 12:
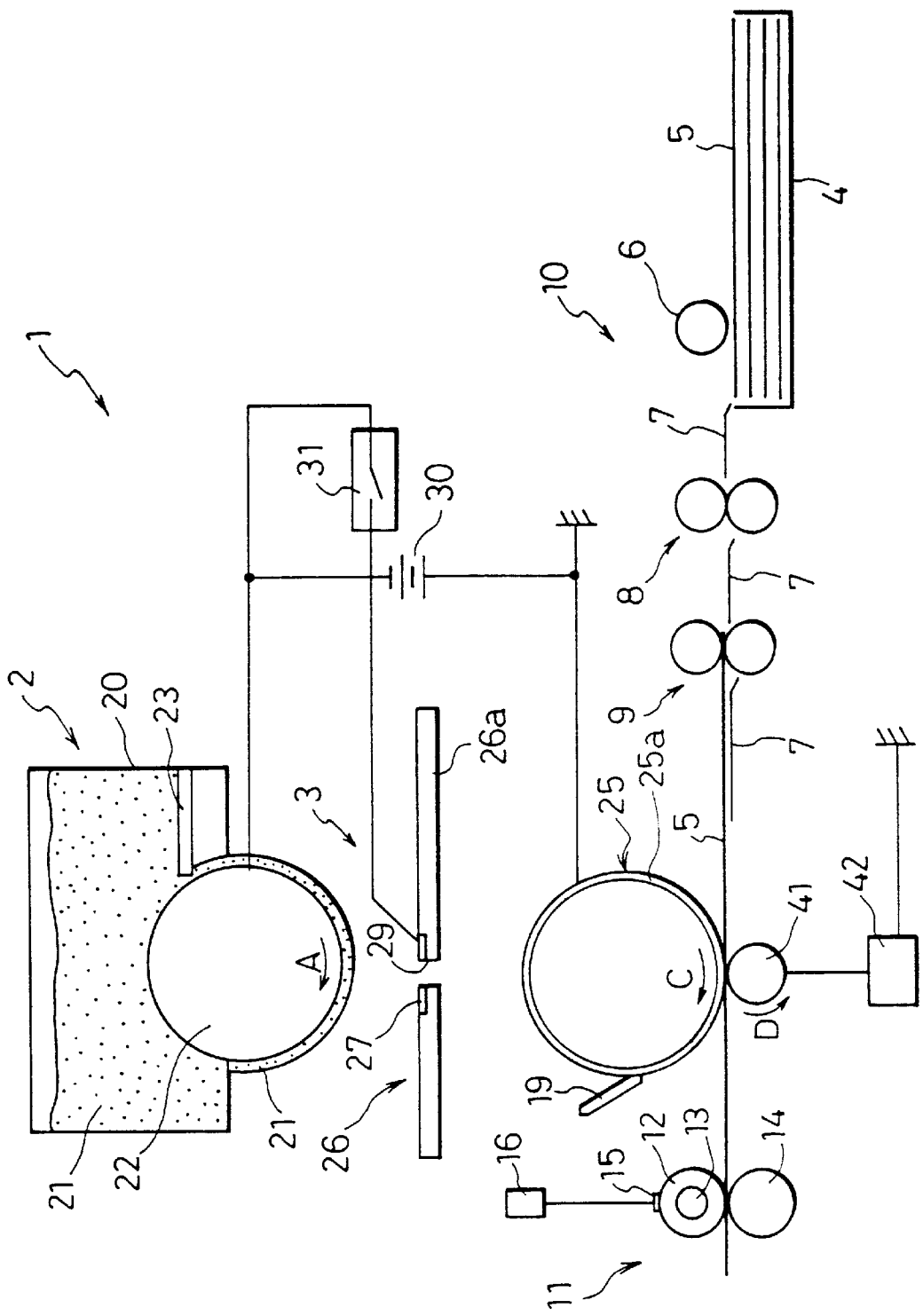
FIG. 12 is a schematic front view which shows an overall arrangement of an image forming apparatus in another embodiment of the present invention.

The following describes another embodiment of the present invention in reference to FIG. 12. Here, for convenience of explanation, those members that have the same arrangement and functions, and that are described in the aforementioned embodiment 1 are indicated by the same reference numerals and the description thereof is omitted.

As shown in FIG. 12, an image forming apparatus of the present embodiment further includes a transfer unit (transfer means) composed of a transfer roller 41 and a transfer power source section 42. The transfer roller 41 and the transfer power source section 42 transfer an image (toner image), which is developed on the surface of the counter electrode 25, onto a sheet 5. Namely, in the image forming apparatus, after the toner 21 is allowed to fly so as to adhere to the surface of the counter electrode 25 temporarily, the image forming apparatus transfers the toner 21 onto the sheet 5, thereby forming an image on the sheet 5. Consequently, the sheet 5 is not placed on an opposite position of the counter electrode 25 to the toner holder 22 but on a back face of the counter electrode 25 to the toner holder 22, namely, between the counter electrode 25 and the transfer roller 41.

The counter electrode 25 in the image forming apparatus of the present embodiment is arranged such that an insulating layer is formed on a surface of a metal tube made of aluminum, etc. Moreover, the counter electrode 25 is driven by a driving unit, not shown, so as to be rotated in the direction of arrow "C" in FIG. 8, namely, in the direction in which the toner holder 22 rotates.

The transfer roller 41 is provided with it pressing against the counter electrode 25. The transfer roller 41 is formed such that an electrically conductive material, such as carbon black, is added to single foaming rubber with hardness of Askar C 40° whose base material is silicone resin and whose diameter is 15 mm, and it has electric resistance of approximately 10 M. Moreover, the transfer roller 41 is driven by a driving unit, not shown, so as to be rotated in the direction of arrow "D" in FIG. 12, namely, in the opposite direction in which the counter electrode 25 rotates. On a portion where the transfer roller 41 presses against the sheet 5, the speed of the surface of the transfer roller 41 is substantially equal to the speed of the surface of the counter electrode 25. The transfer power source section 42 contains a resistor, etc. of 500 MΩ, and it applies a transfer voltage of 3 kV, for example, to the transfer roller 41. Materials of the counter electrode 25 and the transfer roller 41 are not particularly limited. Moreover, the electric resistance of the transfer roller 41 and the transfer voltage to be applied to the transfer roller 41 are not particularly limited. The other arrangements are same as of the image forming apparatus of the aforementioned embodiment 1.

The following describes an image forming operation by the image forming apparatus. Here, as to the same image forming operation as by the image forming apparatus of the embodiment 1, the explanation thereof is briefly given.

First, the same image forming operation as that of the aforementioned embodiment 1 is performed. Image data stored in the image memory are converted into a control electrode control signal by an image forming control unit. Then, the register roller 9 is actuated, and a sheet 5 which is suspended with its end contacting with the register roller 9 is transported between the counter electrode 25 and the transfer roller 41 in the printing section 3 of the image forming section 1.

Thereafter, the image forming control unit supplies the control electrode control signal to the control power source section 31. The control power source section 31 controls a voltage applied to each ring electrode 27 of the control electrode 26 according to the control electrode control signal, and a toner image according to an image signal is formed on the surface of the counter electrode 25 which rotates at a fixed speed. The register roller 9 supplies the sheets 5 to the printing section 3 at intervals which substantially synchronize with the formation of the toner image on the surface of the counter electrode 25. The supplied sheets 5 are transferred towards a sheet discharge side by the revolution of the counter electrode 25 and of the transfer roller 41 at a fixed speed.

When the toner image formed on the surface of the counter electrode 25 reaches between the counter electrode 25 and the transfer roller 41 by the revolution of the counter electrode 25 and of the transfer roller 41, namely, the toner image presses against the sheet 5, a transfer voltage of 3 kV is applied to the transfer roller 41 by the transfer power source section (voltage applying means) 42. The transfer voltage is applied at timing which synchronizes with the arrival of the toner image. As a result, the toner image formed on the surface of the counter electrode 25 is transferred onto the sheet 5.

The sheet 5 on which the toner image has been transferred is transported to the fixing section 11, and after the toner image is fixed on the sheet 5 in the fixing section 11, the sheet 5 is discharged onto a sheet discharge tray by a sheet discharge roller.

Meanwhile, the surface of the counter electrode 25 where the toner image has been transferred is rubbed by the cleaning blade 19 until the counter electrode 25 again comes to the opposite position to the control electrode 26. For this reason, if toner remains on the surface of the counter electrode 25 after the transferring, the toner is removed.

Consequently, the surface of the counter electrode 25 again comes to the opposite position to the control electrode 26, and the toner image is formed thereon.

A satisfactory image is formed on a sheet 5 by the above image forming operation. In the image forming apparatus of the present embodiment, after the toner 21 is allowed to fly so as to temporarily adhere to the surface of the counter electrode 25, the toner 21 is transferred onto a sheet 5, and an image is formed on the sheet 5. For this reason, quality of an image is not affected by a material, a size, a shape, surface properties, etc. of a sheet 5. In other words, since an image is formed by transferring a toner image onto a sheet 5, the flying state of the toner 21, a size and a shape of a dot, etc. do not depend on a material, a size, a shape, surface properties, etc. of a sheet 5. Therefore, a sheet 5, namely, a recording medium is not limited to plain paper, so various kinds of paper can be used as the recording medium. An example of such paper is uneven paper with coarse surface, such as wrinkled paper and a rear face of an envelope coarse surface. An image with good quality can be stably formed on the recording medium.

In addition, since there is no danger of the control electrode 26 damaged by the sheets 5 and of a high voltage applied from the counter electrode 25 to the control electrode 26 via the sheets 5, various troubles caused by the sheets 5 can be avoided, thereby further improving the reliability of the apparatus.

As mentioned above, the image forming apparatus of the present embodiment is arranged so as to include the transfer roller 41 and the transfer power source section 42 which transfer the toner image formed on the counter electrode 25 onto the sheets 5.

As a result, even in the case where uneven paper with coarse surface, such as wrinkled paper and a rear face of an envelope are used as the sheets 5, namely, the recording medium, an image with good quality can be stably formed on such recording media.

Embodiment 3

Figure 13:
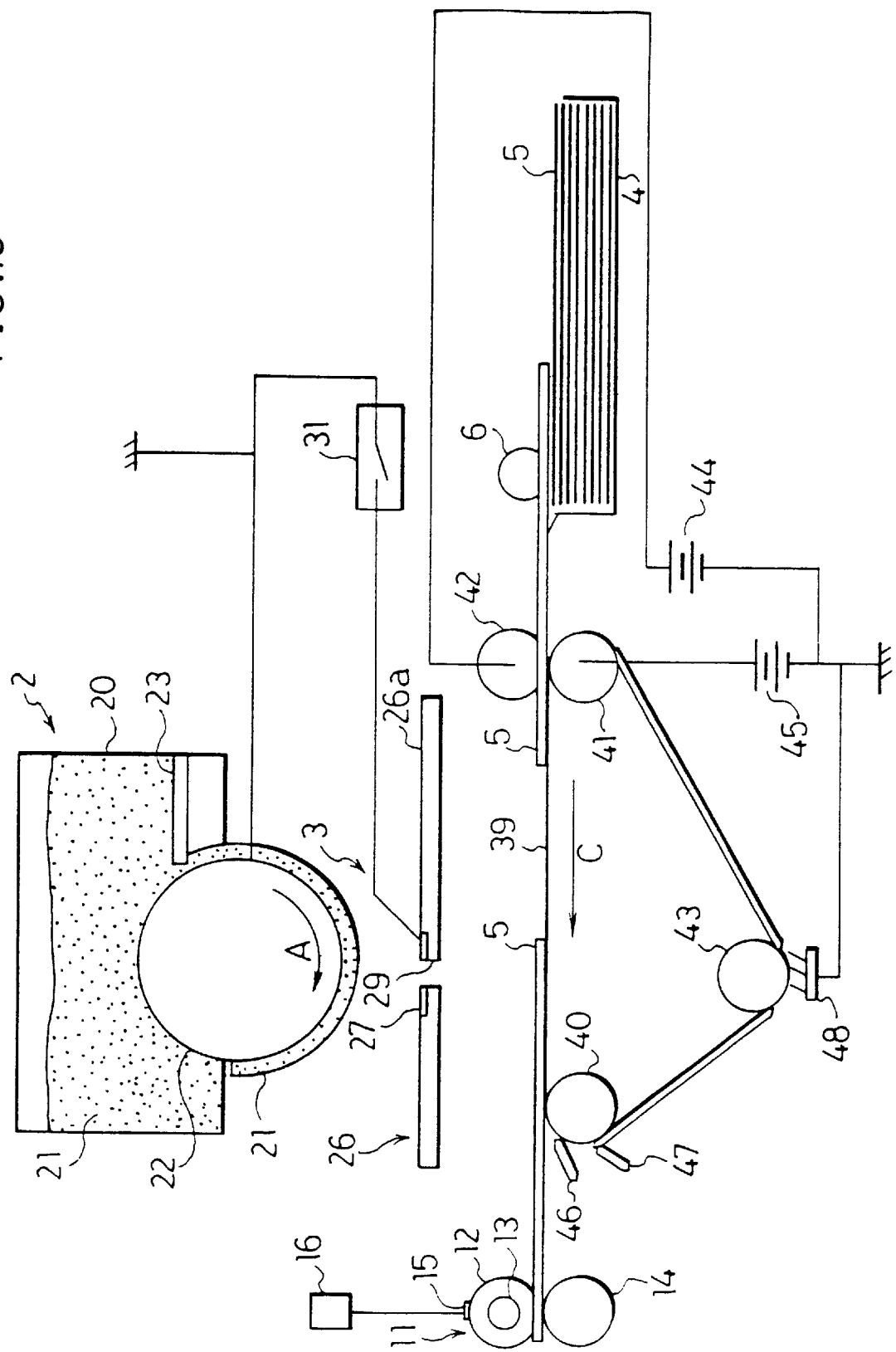
FIG. 13 is a schematic front view which shows an overall arrangement of an image forming apparatus in still another embodiment of the present invention.
Figure 14:
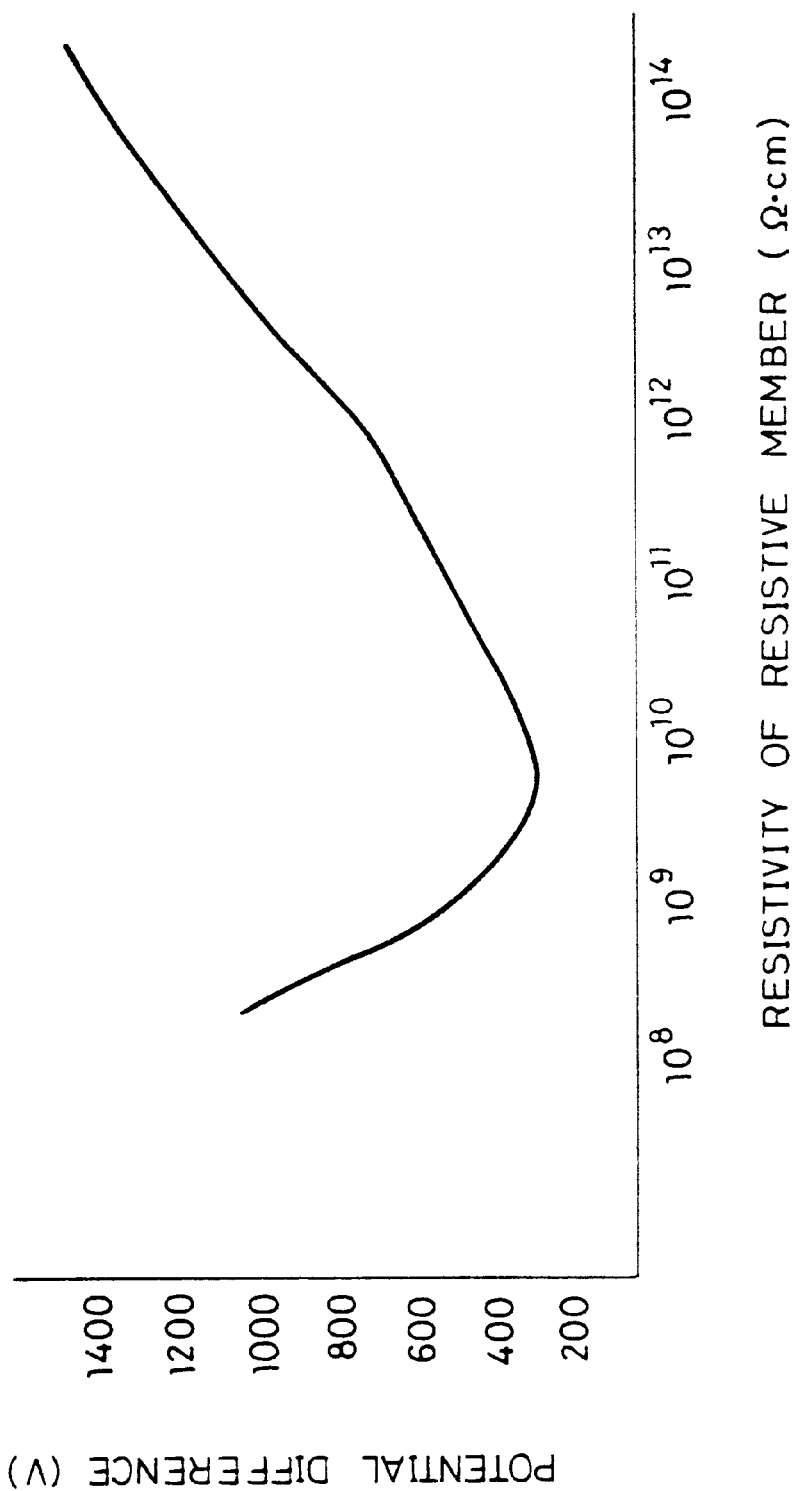
FIG. 14 is a graph which shows a relationship between a resistance value of a resistor on the counter electrode and a potential difference that is necessary for adhesion of a recording medium to the counter electrode when paper is used as a recording medium in the image forming apparatus shown in FIG. 13.
Figure 15:
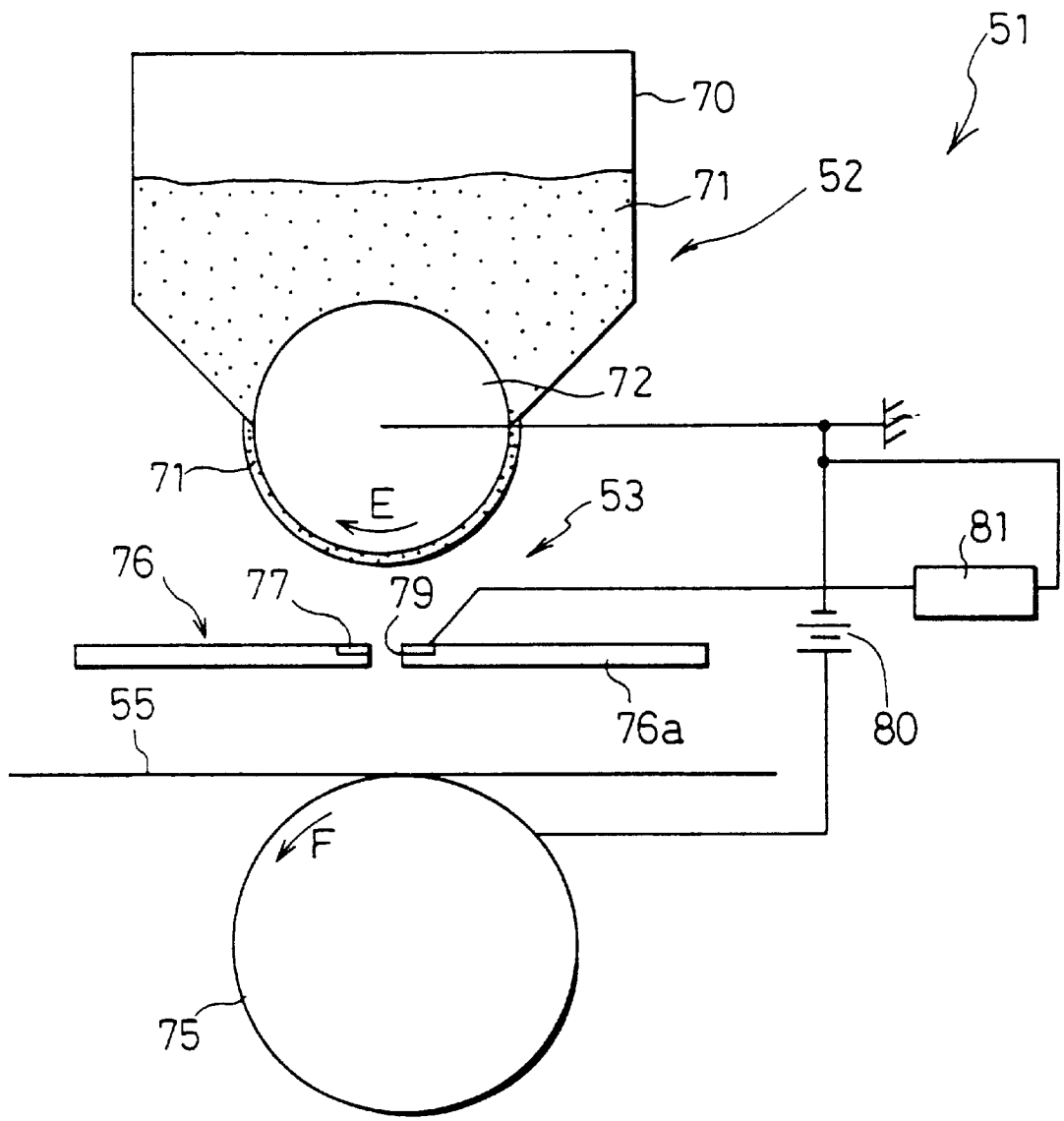
FIG. 15 is a schematic front view which shows an overall arrangement of a conventional image forming apparatus.

The following describes still another embodiment of the present invention in reference to FIGS. 13 and 14. Here, for convenience of explanation, those members that have the same arrangement and functions, and that are described in the aforementioned embodiment 1 are indicated by the same reference numerals and the description thereof is omitted.

As shown in FIG. 13, an image forming apparatus of the present invention uses a belt-like counter electrode 39, and a metal roller 40, a metal roller 41 and metal roller 43 for driving the counter electrode 39 are provided inside the counter electrode 39. Moreover, asemiconductive rubber roller (contact member) 42 made of semiconductive rubber is provided in a position that is opposite to the metal roller 41 across the counter electrode 39.

The semiconductive roller 42 is connected to a high voltage power source (potential supplying means) 44, electric charges, that have same polarity as that of the toner 21, namely, opposite polarity to that of the counter electrode 39, are supplied to the surface of a sheet 5. Moreover, as shown in FIG. 13, a peeling claw 46, a cleaning blade 47 and a charge eliminating brush 48 are positioned on the counter electrode 39.

The surface of the counter electrode 39 is a resistant member having resistivity of $10^{12}$ Ω·cm and a thickness of 75 μm which is composed of PVDF (polyvinylidene difluoride), and its inside is a conductor. A high voltage power source 44 supplies a potential of 2.8 kV to the counter electrode 39 through the semiconductive roller 42. Furthermore, a power source 45 supplies a potential of 1.3 kV to the metal roller 41. In this case, the electric field forming means is composed of the metal roller 41 and the high voltage power source 44.

In accordance with the above arrangement, the following describes image forming operations by the image forming apparatus. The same image forming operations as those by the image forming apparatus in the embodiment 1 are briefly explained.

Differences between the arrangement of the embodiment 1 and the arrangement of this embodiment are a counter electrode and a portion that is related to carrying of a recording member, and since the other parts are same as that described in the aforementioned embodiments, description thereof are omitted.

First, the same image forming operation as that of the aforementioned embodiment 1 is performed such that image data stored in an image memory are converted into a control electrode control signal by an image forming control unit. The semiconductive roller 42 and the counter electrode 39 are actuated so that a sheet 5, that temporarily stops with the forward end of the sheet 5 contacting with the semiconductive roller 42, is carried to the face of the counter electrode 39 on the printing section 3 of the image forming section 1 that is opposite to the toner holder 22.

When the sheet 5 passes between the metal roller 41 and the semiconductive rubber roller 42, negative electric charges are given to the sheet 5 by a potential difference across the metal roller 41 and the semiconductive rubber roller 42, and a potential of −900 V is generated on the surface of the sheet 5. Then, the sheet 5 is pressed against the counter electrode 39 by the metal roller 41 and the semiconductive rubber roller 42, and the sheet 5 receives electrostatic attractive force due to positive electric charges of the control electrode 39 so as to be attracted to the counter electrode 39. The sheet 5 is carried in the advancing direction of the counter electrode 39 (the direction of arrow "C") with the sheet 5 attracted to the counter electrode 39.

When the sheet 5 is carried to a position corresponding to the gates 29 of the control electrode 26, a charging potential on the face of the sheet 5 decays from the potential supplied across the metal roller 41 and the semiconductive rubber roller 42. However, the value of potential −900 V is set in expectation of an amount of decayed potential. In this case, the potential on the face of the sheet 5 in the position corresponding to the gates 29 of the control electrode 26 is −800 V. The potential to be supplied from the high voltage power supply 44 to the counter electrode 39 through the metal roller 41 is 2.8 kV. Since the potential in the position corresponding to the gates 29 of the control electrode 26 is the sum of the charging potential on the face of the sheet 5 and the potential on the counter electrode 39 supplied from the high voltage power source 44, the potential of the sheet 5 in the position corresponding to the gates 29 is 2 kV. As a result, the same electric field as that of the embodiment 1 can be formed between the toner holder 22 and the counter electrode 39.

Therefore, in the present embodiment, the same control as in the embodiment 1 is possible merely by adjusting the potentials of the metal roller 41 and the semiconductive rubber roller 42 without specially changing other potentials or characteristics of toner.

The image forming control unit supplies a control electrode control signal to a control power source section 31. The control power source section 31 controls the potential to be supplied to each ring electrode 27 of the control electrode 26 according to the control electrode control signal so that a toner image according to an image signal is formed on a sheet 5 that moves horizontally to the direction of arrow "C" at a prescribed speed.

Thereafter, the sheet 5 on which the toner image was transferred comes off the counter electrode 39 by the peeling claw 46 so as to be carried to the fixing section 11. The toner image is fixed on the sheet 5 by the fixing section 11, and the sheet 5 is discharged onto a discharge tray by a discharge roller. After electric charges are eliminated from the counter electrode 39 by the charge eliminating brush 48, residual electric charges are eliminated from the surface of the resistant member.

The image forming operations are completed, and an image is formed onto the sheet 5.

In the present embodiment, the semiconductive rubber roller 42 is formed such that an electrically conductive material, such as carbon black, is added to single foaming rubber with hardness of Askar C 40° whose base material is silicone resin and whose diameter is 15 mm, and it has electric resistance of approximately 10 MΩ. Since each cell of the single foaming rubber is independent, the inside of the semiconductive rubber roller 42 is cut off from the external atmosphere. As a result, it is hard for the characteristics of the semiconductive rubber roller 42 to be affected by a change in environment, so the characteristics become stable.

FIG. 14 shows a relationship between a potential difference across the applying potential of the high voltage power source 44 and the applying potential of the power source 45 that are necessary for allowing the sheet 5 to be attracted to the counter electrode 39, and theresistivity of the resistant member on the counter electrode 39. If the resistivity of the resistant member on the counter electrode 39 is too high, it is hard to supply sufficient electric charges to the sheet 5. As a result, attracting force to the counter electrode 39 becomes insufficient, and thus the carrying of the sheet 5 becomes difficult. For this reason, it is desirable that theresistivity on the surface of the counter electrode 39 is not more than $10^{15}$ Ω•m.

It is necessary that the resistivity of the resistant member on the counter electrode 39 is higher than at least the standard value of the resistivity of the sheet 5, namely, $10^8$ Ω•cm in order to maintain supplied electric charges. Moreover, if the resistivity of the resistant member is too low, the electric charges quickly come off the surface of the sheet 5, so the sheet 5 loses the attracting force to the counter electrode 39. For this reason, it is necessary to supply a lot of electric charges to the 3surface of the sheet 5 in anticipation of electric charges that come off the sheet 5. When lowering of resistance at the time of high temperatures and high humidity is considered, it is desirable that the resistivity on the surface of the counter electrode 39 is not less than $10^{11}$ Ω•cm.

In other words, it is desirable that the resistivity of the resistant member on the counter electrode 39 is within the range of $10^{11}$ to $10^{15}$ Ω•cm. Therefore, in the present embodiment, the resistivity is set to $10^{12}$ Ω•cm.

In addition, in the present embodiment, gates 29 are controlled by the ring electrodes 27, but it is clear that the gates 29 may be controlled by matrix-like electrodes mentioned in the embodiment 1. Even if the arrangement of the toner supplying section 2 adopts the ion-flow method, the same functions and effects as the above can be obtained.

When a counter electrode has curvature like a conventional arrangement, a distance between a control electrode or a developing particles holder and the counter electrode is different between on the center portion and on the circumferential portion of the control electrode, and thus toner flying distance is different from on the both portions of the control electrode. As a result, irregularity of an image occurs. As a countermeasure to this problem, it is considered that a potential to be supplied to a control electrode is varied on the center portion and the circumferential portion of the control electrode, but it is necessary to increase a number of power sources, thereby causing enlargement and rise in cost of an apparatus.

In the present embodiment, since the counter electrode 39 has a belt-like shape, the distance between the control electrode 26 or the toner holder 22 and the counter electrode 39 is substantially same on the center portion and the circumferential portion of the control electrode. As a result, since the flying distance of the toner 21 that passes each gate 29 becomes substantially same on the center portion and on the circumferential portion of the control electrode 26, irregularity of an image can be controlled thereby making it possible to form a satisfactory image.

In addition, in the present embodiment, since the sheet 5 is attracted to the counter electrode 39 by electrostatic force between negative electric charges of the sheet 5 and positive electric charges of the counter electrode 39, the sheet 5 can be attracted to the counter electrode 39 irrespective of the state of the sheet 5, thereby making it possible to carry the sheet 5 more securely.

The invention being thus described, it will be obvious that the invention may be varied in many ways. Such variations are not to be regarded as a departure from the spirit and scope of the invention, and all such modifications as would be obvious to one skilled in the art are intended to be included within the scope of the following claims.

What is claimed is:

1. An image forming apparatus for forming an image on a recording medium by allowing development particles to fly, comprising:

charged development particles;

a holder for holding said development particles;

a counter electrode provided opposite to said holder;

a control electrode formed with a plurality of circular gates for allowing the development particles to pass, said control electrode being located between said holder and said counter electrode;

electric field forming means for forming a fixed electric field for allowing said development particles to fly from said holder to said counter electrode by generating a fixed potential difference across said holder and said counter electrode; and control means supplying a time-varying potential to said control electrode, thereby controlling a passage of said development particles through said gates, wherein said control means controls the time-varying potential supplied to said control electrode so that, when said development particles are allowed to pass through said gates, the time-varying potential becomes closer to a potential of said holder than to a potential that is generated on center portions of the gates by the electric field, whereby dots having diameters smaller than diameters of said gates are formed on said recording medium.

2. The image forming apparatus as defined in claim 1, wherein:

a surface of said holder is movable at a fixed relative speed to said control electrode, said control means changes the time-varying potential supplied to said control electrode with a fixed period.

3. The image forming apparatus as defined in claim 2, wherein said control means sets a time interval for continuously supplying a potential which allows said development particles to pass to said control electrode longer than a time required for allowing said development particles, which are held on positions on the surface of said holder corresponding to the gates, to fly.

4. The image forming apparatus as defined in claim 3, wherein said control means controls th e time-varying potential supplied to said control electrode so that the time-varying potential becomes a time-varying potential which allows all the development particles, held on the positions on the surface of said holder corresponding to the gates, to fly.

5. The image forming apparatus as defined in claim 1, wherein said recording medium is placed on a face of said counter electrode which is opposite to said holder.

6. The image forming apparatus as defined in claim 5, wherein said control means controls the time-varying potential supplied to said control electrode so that the following equation is fulfilled:

$$2qvP(S/\pi)^{1/2} \geq (\pi MR^3 \tan \theta)/3 - qS$$

where q (g/cm$^2$) is a density of said development particles on the surface of said holder per unit area, S (cm$^2$) is an area of a range where an electric field which makes said development particles possible to fly is formed on the surface of said holder, v(cm/sec) is a relative speed of the surface of said holder to said control electrode, M(g/cm$^3$) is specific gravity of said development particles, θ(°) is an angle of repose of said development particles on the recording medium, P(sec) is a time for continuously supplying the time-varying potential, which allows said development particles to pass, to said control electrode, and 2R(cm) is a maximum length of a range on the recording medium to which said development particles adhere at a substantial moment the time-varying potential starts to be supplied to said control electrode.

7. The image forming apparatus as defined in claim 6, wherein said control means controls the time-varying potential supplied to said control electrode so that the time-varying potential becomes a potential which allows all the development particles, which are held on positions on the surface of said holder corresponding to the gates, to fly.

8. The image forming apparatus as defined in claim 1, wherein:
   an earth potential is supplied to said holder by said electric field forming means, and
   a potential having a polarity opposite to a polarity of the development particles is supplied to said counter electrode by said electric field forming means.

9. The image forming apparatus as defined in claim 1, wherein an oscillating potential is supplied to said holder by said electric field forming means within a range in which a relationship between the oscillating potential and the potential of the counter electrode does not change.

10. The image forming apparatus as defined in claim 1, wherein said control electrode includes
   an insulating substrate formed with said plurality of gates; and
   an electrode layer to which said time-varying potential from said control electrode is supplied, said electrode layer being formed on said substrate.

11. The image forming apparatus as defined in claim 10, wherein said electrode layer is composed of a plurality of ring electrodes provided around said respective gates.

12. The image forming apparatus as defined in claim 10, wherein the gates are provided in a grid pattern so as to be arranged along a first direction and a second direction that are different from each other,
   wherein said electrode layer includes:
      a first electrode layer composed of a plurality of first zonal electrodes that are provided so as to surround the plural gates arranged along the first direction, said first electrode layer being formed on a holder side of said substrate; and
      a second electrode layer composed of a plurality of second zonal electrodes that are provided so as to surround the plural gates arranged along the second direction, said second electrode layer being formed on a counter electrode side of said substrate.

13. The image forming apparatus as defined in claim 10, wherein said control electrode further includes an insulating layer provided so as to cover said electrode layer.

14. The image forming apparatus as defined in claim 1, wherein said counter electrode is a rotatable roller.

15. The image forming apparatus as defined in claim 14, wherein said holder is a holding roller which rotates in a direction in which said counter electrode rotates.

16. The image forming apparatus as defined in claim 1, further comprising cleaning means for removing toner adhered to a surface of said counter electrode by rubbing the surface of said counter electrode.

17. The image forming apparatus as defined in claim 1, wherein:
   said counter electrode is a belt member that is provided so as to be parallel with said control electrode at least in an area where the gates are formed.

18. The image forming apparatus as defined in claim 1, further comprising:
   electric charge supplying means for supplying electric charges with polarity opposite to a polarity of said counter electrode to a recording medium,
   wherein said electric charge supplying means supplies electric charges for forming the fixed electric field by a difference between the sum of the potential formed by the electric charges supplied to the recording medium and of the potential of said counter electrode and the potential of said holder.

19. The image forming apparatus as defined in claim 18, wherein said counter electrode is a belt member provided so as to be parallel with said control electrode at least in an area where the gates are formed.

20. The image forming apparatus as defined in claim 18, wherein:
   the recording medium is provided on a face of the counter electrode across from said holder;
   a potential having a polarity opposite to a polarity of the development particles is supplied to said counter electrode by said electric field forming means;
   said electric charge supplying means includes:
      a contact member contacting the recording medium; and
      potential supplying means for supplying a potential that has an absolute value smaller than an absolute value of the potential supplied to said counter electrode, to said contact member.

21. The image forming apparatus as defined in claim 1, further comprising transfer means for transferring an image formed on said counter electrode onto a recording medium.

22. The image forming apparatus as defined in claim 21, further comprising cleaning means for removing said development particles adhered to the surface of said counter electrode by rubbing surface of said counter electrode.

23. The image forming apparatus as defined in claim 21, wherein:

said counter electrode is a rotatable roller, said recording medium is placed between said counter electrode and said transfer means so as to be contact with said counter electrode.

24. The image forming apparatus as defined in claim 21, wherein said transfer means includes:

a rotatable transfer roller contacting a rear face of a counter face of the recording medium to said counter electrode; and voltage-applying means for applying a voltage to said transfer roller.

25. An image forming apparatus for forming an image on a recording medium by allowing development particles to fly, comprising:

positively charged development particles;

a holder for holding said development particles;

a counter electrode provided opposite to said holder;

a control electrode formed with a plurality of circular gates for allowing the development particles to pass, said control electrode being located between said holder and said counter electrode;

electric field forming means for forming a fixed electric field for allowing said development particles to fly from said holder to said counter electrode by generating a fixed potential difference across said holder and said counter electrode; and control means supplying a time-varying potential to said control electrode, thereby controlling passage of said development particles through said gates, wherein said control means controls the time-varying potential supplied to said control electrode so that, when said development particles are allowed to pass through said gates, the time-varying potential becomes higher than a potential that is generated on center portions of the gates by the electric field, whereby dots having diameters smaller than diameters of said gates are formed on said recording medium.

26. An image forming apparatus for forming an image on a recording medium by allowing development particles to fly, comprising:

negatively charged development particles;

a holder for holding said development particles;

a counter electrode provided opposite to said holder;

a control electrode formed with a plurality of circular gates for allowing the development particles to pass, said control electrode being located between said holder and said counter electrode;

electric field forming means for forming a fixed electric field for allowing said development particles to fly from said holder to said counter electrode by generating a fixed potential difference across said holder and said counter electrode; and control means supplying a time-varying potential to said control electrode, thereby controlling passage of said development particles through said gates, wherein said control means controls the time-varying potential supplied to said control electrode so that, when the time-varying particles are allowed to pass through said gates, the potential becomes lower than a potential that is generated on center portions of the gates by the electric field, whereby dots having diameters smaller than diameters of said gates are formed on said recording medium.

27. An image forming apparatus for forming an image on a recording medium by allowing developing particles to fly, comprising:

charged developing particles;

a holder for holding said developing particles that can move so that said holder's surface moves at a relative speed to a control electrode;

a counter electrode provided so as to be opposite to said holder;

a control electrode formed with a plurality of gates for allowing the developing particles, said control electrode being provided between said holder and said counter electrode;

electric field forming means for forming a prescribed electric field that allows said developing particles to fly from said holder towards said counter electrode by generating a prescribed potential difference across said hold and said counter electrode; and control means for controlling passage of said developing particles through each of said gates by changing a potential to be supplied to said control electrode at a prescribed period, wherein said control means controls a time for continuously supplying a potential, which allows said development particles to pass, to said control electrode becomes longer than a time required for allowing said development particles, which are held on positions on the surface of said holder corresponding to the gates, to fly.

28. The image forming apparatus as defined in claim 27, wherein said control means controls the potential to be supplied to said control electrode so that the potential becomes a potential which can allow all the development particles held on the positions on the surface of said holder corresponding to the gates to fly.

29. An image forming apparatus for allowing developing particles to fly and adhere directly to a recording medium, whereby forming an image on the recording medium, comprising:

charged developing particles;

a holder for holding said developing particles;

a counter electrode provided so as to be opposite to said holder;

a control electrode formed with a plurality of circular gates for allowing the developing particles to pass, said control electrode being located between said holder and said counter electrode;

electric field forming means for forming a prescribed electric field for allowing said developing particles to fly form said holder towards said counter electrode by generating a prescribed potential difference across said holder and said counter electrode; and control means for controlling passage of said developing particles through said gates by supplying a time-varying potential to be applied to said control electrode, wherein said control means controls the time-varying potential supplied to said control electrode so that the following equation is fulfilled:

$$2qvP(S/\pi)^{1/2} \geq (\pi MR^3 \tan \theta)/3 - qS$$

where q (g/cm$^2$) is a density of said development particles on the surface of said holder per unit area, S (cm$^2$) is an area of a range where an electric field which makes said development particles possible to fly is formed on the surface of said holder, v(cm/sec) is a relative speed of the surface of said holder to said control electrode, M(g/cm$^3$) is specific gravity of said development particles, θ(°) is an angle of repose of said development particles on the recording medium, P(sec) is a time for continuously supplying the time-varying potential, which allows said development particles to pass, to said control electrode, and 2R(cm) is a maximum length of a range on the recording medium to which said development particles adhere at a substantial moment the time-varying potential starts to be supplied to said control electrode.

30. The image forming apparatus as defined in claim 29, wherein said control means controls the time-varying potential to be supplied to said control electrode so that the time-varying potential becomes a potential which can allow all the development particles held on the positions on the surface of said holder corresponding to the gates to fly.

31. An image forming apparatus for forming an image on a recording medium by allowing developing particles to, comprising:

charged developing particles;

a holder for holding said developing particles;

a counter electrode provided so as to be opposite to said holder;

a control electrode formed with a plurality of circular gates for allowing the developing particles to pass, said control electrode being located between said holder and said counter electrode;

electric field forming means for forming a prescribed electric field for allowing said developing particles to fly from said holder towards said counter electrode by generating a prescribed potential difference across said holder and said counter electrode;

control means for controlling passage of said developing particles through said gates by supplying a time-varying potential to be applied to said control electrode so as to allow said developing particles to adhere to said counter electrode; and transfer means for transferring an image formed on said counter-electrode onto the recording medium, wherein said control means controls the time-varying potential supplied to said control electrode so that the following equation is fulfilled:

$$2qvP(S/\pi)^{1/2} \geq (\pi MR^3 \tan \theta)/3 - qS$$

where q (g/cm$^2$) is a density of said development particles on the surface of said holder per unit area, S (cm$^2$) is an area of a range where an electric field which makes said development particles possible to fly is formed on the surface of said holder, v(cm/sec) is a relative speed of the surface of said holder to said control electrode, M(g/cm$^3$) is specific gravity of said development particles, θ(°) is an angle of repose of said development particles on the recording medium, P(sec) is a time for continuously supplying the time-varying potential, which allows said development particles to pass, to said control electrode, and 2R(cm) is a maximum length of a range on the recording medium to which said development particles adhere at a substantial moment the time-varying potential starts to be supplied to said control electrode.

32. The image forming apparatus as defined in claim 31, wherein said control means controls the time-varying potential to be supplied to said control electrode so that the time-varying potential becomes a potential which can allow all the development particles held on the positions on the surface of said holder corresponding to the gates to fly.

33. An image forming apparatus for forming an image on a recording medium by allowing development particles to fly, comprising:

charged development particles;

a holder for holding said development particles;

a counter electrode provided opposite to said holder;

a control electrode formed with a plurality of circular gates for allowing the development particles to pass, said control electrode being located between said holder and said counter electrode;

electric field forming means for forming a prescribed electric field for allowing said development particles to fly from said holder to said counter electrode by generating a prescribed potential difference across said holder and said counter electrode; and control means for controlling passage of said developing particles through said gates by changing the time-varying potential applied to said control electrode, wherein said control means includes:

an insulating substrate having a plurality of gates;

a first electrode layer to which a first time-varying potential is supplied, said first electrode layer being form on a holder side of said substrate; and a second electrode layer to which a second time-varying potential is supplied, said second electrode layer being formed on a counter electrode side of said substrate, wherein said control means controls the second time-varying potential so that the second time-varying potential becomes closer to a potential of said holder than a potential on center portions of the gates that is caused by the electric field, whereby dots having diameters smaller than diameters of said gates are formed on said recording medium.

34. The image forming apparatus as defined in claim 33, wherein:

said gates are provided in a grid pattern so as to be arranged along a first direction and a second direction that are different from each other, said first electrode layer is composed of a plurality of first zonal electrodes that are provided so as to surround the gates arranged along the first direction, said second electrode layer is composed of a plurality of second zonal electrodes that provided so as to surround the gates arranged along the second direction.

* * * * *